(12) United States Patent
Li et al.

(10) Patent No.: US 10,442,980 B2
(45) Date of Patent: Oct. 15, 2019

(54) POLYMER EMULSIONS FOR USE IN CRUDE OIL RECOVERY

(71) Applicant: Ecolab USA Inc., Eagan, MN (US)

(72) Inventors: Xiaojin Harry Li, Palatine, IL (US); Peter E. Reed, Plainfield, IL (US); William J. Andrews, Parker, CO (US)

(73) Assignee: Ecolab USA Inc., St. Paul, MN (US)

( * ) Notice: Subject to any disclaimer, the term of this patent is extended or adjusted under 35 U.S.C. 154(b) by 0 days.

(21) Appl. No.: 14/445,599

(22) Filed: Jul. 29, 2014

(65) Prior Publication Data

US 2016/0032170 A1     Feb. 4, 2016

(51) Int. Cl.
| | | |
|---|---|---|
| *E21B 43/16* | (2006.01) | |
| *C09K 8/584* | (2006.01) | |
| *C09K 8/588* | (2006.01) | |

(52) U.S. Cl.
CPC .............. *C09K 8/584* (2013.01); *C09K 8/588* (2013.01)

(58) Field of Classification Search
CPC .......... E21B 33/13; E21B 43/26; E21B 43/16; E21B 43/25; C09K 8/588; C09K 8/512; C09K 8/516; C09K 8/50831; C09K 8/68; C09K 8/12
See application file for complete search history.

(56) References Cited

U.S. PATENT DOCUMENTS

| | | | |
|---|---|---|---|
| 912,065 A | 2/1909 | Bostrom | |
| 3,247,171 A | 4/1966 | Walker et al. | |
| 3,551,384 A | 12/1970 | Zeh, Jr. | |
| 3,938,594 A | 2/1976 | Rhudy et al. | |
| 3,953,342 A | 4/1976 | Martin et al. | |
| 4,137,182 A | 1/1979 | Golinkin | |
| 4,250,070 A | 2/1981 | Ley et al. | |
| 4,728,696 A | 3/1988 | Van Phung et al. | |
| 4,779,680 A | 10/1988 | Sydansk | |
| 4,842,071 A * | 6/1989 | Zaitoun et al. ............... | 166/295 |

(Continued)

FOREIGN PATENT DOCUMENTS

| | | |
|---|---|---|
| CN | 101148582 A | 3/2008 |
| CN | 103387637 A | 11/2013 |

(Continued)

OTHER PUBLICATIONS

Tillet et al. "Chemical reactions of polymer crosslinking and post-crosslinking at room and medium temperature" Progresss in Polymer Science 36(2011) 191-217.*

(Continued)

*Primary Examiner* — Angela M DiTrani Leff
*Assistant Examiner* — Charles R Nold
(74) *Attorney, Agent, or Firm* — Stinson LLP

(57) ABSTRACT

Emulsions of mobility control polymers can be used to increase recovery of crude oil from a subterranean hydrocarbon-containing formation. A flooding fluid comprising the polymer emulsions are injected into a well that is in contact with the subterranean hydrocarbon-containing formation. The polymers can be temporarily cross-linked and have protected shear degradation and improved injectivity into the well; the shear resistance can be measured in terms of viscosity loss due to shear, and the improved injectivity can be measured in terms of the flooding fluid's filter ratio, flow rate, and viscosity.

20 Claims, 2 Drawing Sheets

(56) References Cited

U.S. PATENT DOCUMENTS

| | | | |
|---|---|---|---|
| 4,872,071 A | 10/1989 | Easton et al. | |
| 4,954,538 A | 9/1990 | Dauplaise et al. | |
| 4,970,340 A | 11/1990 | Smith | |
| 5,130,479 A | 7/1992 | Ulbrich et al. | |
| 5,447,199 A | 9/1995 | Dawson et al. | |
| 5,543,446 A | 8/1996 | Rodriguez | |
| 5,840,804 A | 11/1998 | Carl et al. | |
| 5,883,210 A | 3/1999 | Ahmed et al. | |
| 6,235,150 B1 | 5/2001 | Middleton et al. | |
| 6,238,521 B1 | 5/2001 | Shing et al. | |
| 6,302,209 B1 | 10/2001 | Thompson, Sr. et al. | |
| 6,454,003 B1 | 9/2002 | Chang et al. | |
| 6,592,718 B1 | 7/2003 | Wong Shing et al. | |
| 6,729,402 B2 | 5/2004 | Chang et al. | |
| 6,984,705 B2 | 1/2006 | Chang et al. | |
| 7,250,448 B2 | 7/2007 | Walchuk et al. | |
| 7,300,973 B2 | 11/2007 | Chang et al. | |
| 7,482,310 B1 | 1/2009 | Reese et al. | |
| 7,531,600 B1 | 5/2009 | Rey | |
| 7,700,702 B2 | 4/2010 | Gaillard et al. | |
| 7,833,944 B2* | 11/2010 | Munoz et al. | 507/119 |
| 7,888,296 B2 | 2/2011 | Morris et al. | |
| 7,897,546 B2 | 3/2011 | Showalter et al. | |
| 7,902,127 B2 | 3/2011 | Kurian et al. | |
| 7,928,042 B2 | 4/2011 | Reed et al. | |
| 7,947,630 B2 | 5/2011 | Atkins et al. | |
| 7,989,401 B2 | 8/2011 | Kurian et al. | |
| 8,152,962 B2 | 4/2012 | Koch et al. | |
| 8,613,832 B2 | 12/2013 | Nyander et al. | |
| 8,871,692 B2* | 10/2014 | Favero et al. | 507/225 |
| 9,120,965 B2 | 9/2015 | Kurian et al. | |
| 2003/0150575 A1 | 8/2003 | Hund et al. | |
| 2003/0168192 A1 | 9/2003 | Mohammed | |
| 2004/0040683 A1 | 3/2004 | Hund et al. | |
| 2004/0209780 A1 | 10/2004 | Harris et al. | |
| 2005/0150622 A1 | 7/2005 | Hund et al. | |
| 2005/0161182 A1 | 7/2005 | Capwell | |
| 2005/0272889 A1 | 12/2005 | Kiyosada et al. | |
| 2006/0030493 A1 | 2/2006 | Segura | |
| 2006/0142476 A1* | 6/2006 | Weerawarna | 525/54.1 |
| 2006/0243407 A1 | 11/2006 | Hund et al. | |
| 2006/0270801 A1 | 11/2006 | Hagiopol et al. | |
| 2007/0277981 A1 | 12/2007 | Robb et al. | |
| 2009/0283232 A1 | 11/2009 | Hund et al. | |
| 2010/0234251 A1 | 9/2010 | Robb et al. | |
| 2011/0024128 A1 | 2/2011 | Kaminsky | |
| 2011/0136704 A1 | 6/2011 | Sharma et al. | |
| 2011/0155339 A1 | 6/2011 | Brungardt et al. | |
| 2011/0247775 A1 | 10/2011 | Sutman et al. | |
| 2012/0037364 A1 | 2/2012 | Guan et al. | |
| 2012/0058922 A1 | 3/2012 | Favero et al. | |
| 2012/0142847 A1 | 6/2012 | Yang et al. | |
| 2012/0202941 A1 | 8/2012 | Broecher et al. | |
| 2012/0264888 A1 | 10/2012 | Gu et al. | |
| 2013/0005616 A1 | 1/2013 | Gaillard et al. | |
| 2014/0102707 A1 | 4/2014 | Moradi-Araghi et al. | |
| 2014/0144628 A1 | 5/2014 | Moradi-Araghi et al. | |
| 2014/0174683 A1 | 6/2014 | Nyander et al. | |
| 2014/0209304 A1 | 7/2014 | Reed et al. | |
| 2014/0262090 A1 | 9/2014 | Brotherson et al. | |
| 2014/0309368 A1* | 10/2014 | Blondel et al. | 524/801 |
| 2014/0323635 A1 | 10/2014 | Yang et al. | |
| 2015/0267350 A1 | 9/2015 | Brotherson et al. | |
| 2015/0337078 A1* | 11/2015 | Cochran | C08F 122/105 507/219 |

FOREIGN PATENT DOCUMENTS

| | | |
|---|---|---|
| EP | 0 539 289 B1 | 10/1992 |
| EP | 1 069 140 A1 | 1/2001 |
| EP | 1 207 267 A1 | 5/2002 |
| JP | 2011-226042 | 11/2011 |
| JP | 2011-226042 A | 11/2011 |
| WO | 2009/015255 A2 | 1/2009 |
| WO | 2009/131982 A1 | 10/2009 |
| WO | 2010/133258 A1 | 11/2010 |

OTHER PUBLICATIONS

CAS Database List CAS No. 58477-85-3 N,N'-diallyl-L-tartardiamide.*

EOR powerpoint presentation presented during telephone interview Sep. 15, 2016.*

J. Phys. Chem. B, 2011, 115 (14), pp. 3761-3764.*

Kot, E., et al., "Novel Drag-Reducing Agents for Fracturing Treatments Based on Polyacrylamide Containing Weak Labile Links in the Polymer Backbone," SPE International, Presented at the SPE International Symposium on Oilfield Chemistry in The Woodlands, Texas, on Apr. 11-13, 2011, SPE 141257, pp. 1-11.

International Search Report and Written Opinion issued for PCT/US2015/042715 dated Nov. 10, 2015, 14 pages.

International Search Report and Written Opinion issued for PCT/US2014/022627, dated Jul. 7, 2014, 10 pages.

Extended Search Report related to European Patent Application No. 14746670.0 dated Aug. 17, 2016, 6 pages.

Tillet, Guillaume et al., Chemical reactions of polymer crosslinking and post-crosslinking at room and medium temperature, Progress in Polymer Science 36 (2011) pp. 191-217.

International Search Report relating to PCT Application No. PCT/US2017/019096 dated May 22, 2017, 6 pages.

Written Opinion relating to PCT Application No. PCT/US2017/019096 dated May 22, 2017, 8 pages.

CAS Database List—Chemical Book, N,N'-Diallyl-L-Tartardiamide, http://www.chemicalbook.com/ChemicalProductProperty_EN_CB1680601.html, Jun. 5, 2015, 3 pages.

Kot, E. et al., Novel Drag-Reducing Agents for Fracturing Treatments Based on Polyacrylamide Containing Weak Labile Links in the Polymer Backbone, Society of Petroleum Engineers 141257 (2011), 11 pages.

* cited by examiner

POLYMER EMULSIONS FOR USE IN CRUDE OIL RECOVERY

FIELD OF THE INVENTION

The present invention relates to improved emulsions of mobility control polymers that can be used to increase recovery of crude oil from a subterranean hydrocarbon-containing formation. A flooding fluid comprising the polymer emulsions are injected into a well that is in contact with the subterranean hydrocarbon-containing formation. The polymers can be temporarily cross-linked via labile cross-linking moieties resulting in shear protection and improved injectivity into the well. Shear protection can be measured in terms of viscosity loss due to shear, and the improved injectivity can be measured in terms of the flooding fluid's filter ratio, flow rate, and viscosity.

BACKGROUND OF THE INVENTION

In the recovery of oil from oil-bearing reservoirs, it is typically possible to recover only minor portions of the original oil in place by primary recovery methods which utilize only the natural forces present in the reservoir. Thus a variety of supplemental techniques have been developed and used to increase oil recovery. A commonly used secondary technique is waterflooding, which involves injection of water into the oil reservoir. As the water moves through the reservoir, it displaces oil therein to one or more production wells where the oil is recovered.

One problem encountered with waterflooding operations is the relatively poor sweep efficiency of the water, i.e., the water can channel through certain portions of the reservoir as it travels from the injection well(s) to the production well(s), thereby bypassing other portions of the reservoir. Poor sweep efficiency can be due, for example, to differences in the mobility of the water versus that of the oil, and permeability variations within the reservoir, which encourage flow through some portions of the reservoir and not others.

Various enhanced oil recovery techniques have been used to improve sweep efficiency. Aqueous solutions containing high molecular weight, water soluble polymers have been employed to improve sweep efficiency. These media are more viscous than ordinary water or brine, but often undergo molecular weight breakdown or degradation due to shear, temperature, oxidative stress, and physical force of the wellbore. The degradation leads to reduced viscosity and reduced secondary and tertiary recovery rates of oil from subterranean formations. Flooding fluids having improved injectivity into the well, measured in terms of the flooding fluid's filter ratio, flow rate, and viscosity, and flooding fluids having improved resistance to viscosity degradation by shear forces are needed.

SUMMARY OF THE INVENTION

The present invention is directed to methods for increasing recovery of crude oil from a subterranean hydrocarbon-containing formation.

In one aspect, the invention is directed to increasing recovery of crude oil from a subterranean hydrocarbon-containing formation. The method comprises injecting an aqueous flooding fluid into a well that is in contact with the subterranean hydrocarbon-containing formation. The aqueous flooding fluid comprises injection water and a mobility control agent and the mobility control agent comprises a cross-linked water-soluble polymer. The cross-links break to form the water-soluble polymer having fewer cross-links; wherein the aqueous flooding fluid as injected into the well has a filter ratio of from 1 to about 1.2 and a flow rate of at least 0.1 g/s when the membrane filter size is 5 microns and the pressure is 20 psi.

For the methods of increasing recovery of crude oil from a subterranean hydrocarbon-containing formation described herein, the mobility control agent can comprise an emulsion of an aqueous phase and an oil phase. The aqueous phase can comprise the cross-linked water-soluble polymer and the oil phase can comprise a hydrocarbon oil and a surfactant, wherein the surfactant comprises a high molecular weight, structured multiester and/or multiether of a polyol.

A further aspect of the invention is a method for increasing recovery of crude oil from a subterranean hydrocarbon-containing formation. The method comprises injecting an aqueous flooding fluid into a well that is in contact with the subterranean hydrocarbon-containing formation. The aqueous flooding fluid comprises an emulsion of an aqueous phase and an oil phase and the aqueous phase comprises the cross-linked water-soluble polymer and the oil phase comprising a hydrocarbon oil and a surfactant. The surfactant comprises a high molecular weight, structured multiester and/or multiether of a polyol and the cross-links degrade to form the water-soluble polymer having fewer cross-links. In this method, the aqueous flooding fluid as injected into the well has a filter ratio of from about 0.8 to about 1.5 or about 1 to about 1.5 and a flow rate of at least 0.1 g/s when the membrane filter size is 5 microns and the pressure is 20 psi.

DESCRIPTION OF THE PREFERRED EMBODIMENTS

Figure 1:
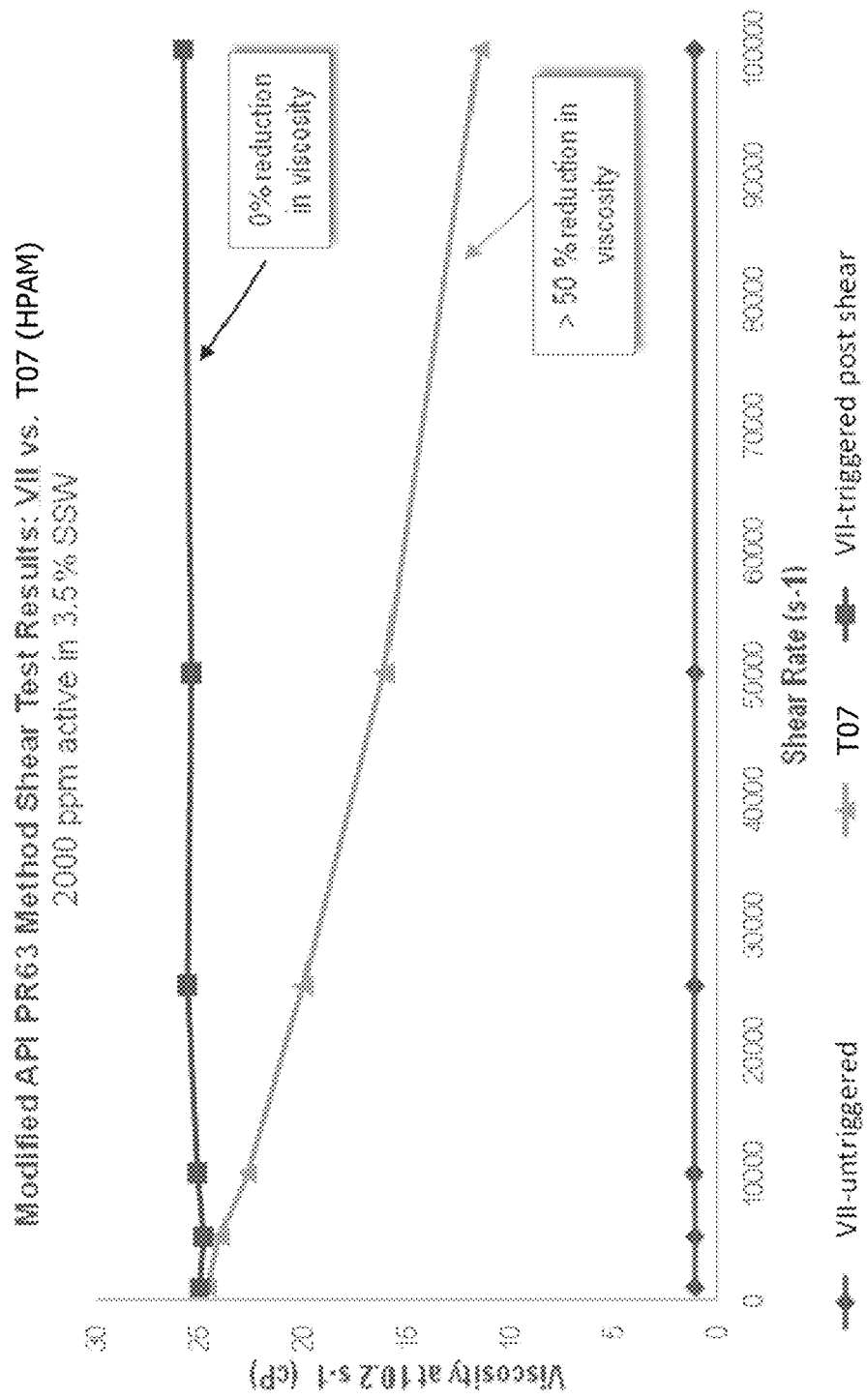
FIG. 1 is a graph of the viscosity at 10.2 $s^{-1}$ (cP) versus shear rate of Polymer VII and a conventional HPAM polymer.

The present invention is directed to water-soluble, shear-resistant, high molecular weight, cross-linked polymers that have improved injectivity and are used to increase recovery of crude oil from a subterranean hydrocarbon-containing formation. In methods of recovering oil from subterranean hydrocarbon-containing formations, an aqueous flooding fluid comprises injection water and a mobility control agent, where the mobility control agent comprises the cross-linked water-soluble polymers wherein the cross-links break to form the water-soluble polymer having fewer cross-links. The aqueous flooding fluid as injected into the well can have a filter ratio of from about 0.8 to about 1.1, from 0.95 to about 1.2, or from about 1 to about 1.2 and a flow rate of at least 0.1 g/s when the membrane filter size is 5 microns and the pressure is 20 psi.

Further, the aqueous flooding fluid as injected into the well can have a filter ratio of from about 0.8 to about 1.1, from 0.95 to about 1.2, or from about 1 to about 1.2 and a flow rate of at least 0.1 g/s when the membrane filter size is 1.2 microns and the pressure is 20 psi.

The cross-linkers are degradable by breaking one or more of the cross-links between polymer strands by heat, hydrolysis, catalysis, enzyme catalysis, oxidation, light, reduction, pH, biological, electrolysis, or a combination thereof.

The cross-links can be hydrolyzable, allowing for changes in the viscosity of the composition following its injection into a subterranean hydrocarbon-containing formation.

The mobility control agent can comprise an emulsion of an aqueous phase and an oil phase, the aqueous phase comprising the cross-linked water-soluble polymer and the oil phase comprising a hydrocarbon oil and a surfactant, wherein the surfactant comprises a high molecular weight, structured multiesters and/or multiethers of a polyol.

The invention is also directed to a method for increasing recovery of crude oil from a subterranean hydrocarbon-containing formation. The method comprises injecting an aqueous flooding fluid into a well that is in contact with the subterranean hydrocarbon-containing formation. The aqueous flooding fluid comprises an emulsion of an aqueous phase and an oil phase, wherein the aqueous phase comprises the cross-linked water-soluble polymer and the oil phase comprises a hydrocarbon oil and an emulsifying surfactant or mixture of surfactants. The emulsifying surfactant comprises a high molecular weight, structured multiesters and/or multiethers of a polyol, the cross-links degrade to form the water-soluble polymer having fewer cross-links, and the aqueous flooding fluid as injected into the well has a filter ratio of from 1 to about 1.5 and a flow rate of at least 0.1 g/s when the membrane filter size is 5 microns and the pressure is 20 psi.

The aqueous flooding fluid as injected into the well can have a filter ratio of from about 0.8 to about 1.4, from about 0.8 to about 1.3, from about 0.8 to about 1.2, from about 0.8 to about 1.2, from about 1 to about 1.4, from about 1 to about 1.3, from about 1 to about 1.2, or from about 1 to about 1.2 when the membrane filter size is 5 microns and the pressure is 20 psi.

The high molecular weight, structured multiesters and/or multiethers of a polyol can have a molecular weight from about 950 Daltons to about 500,000 Daltons, from about 950 Daltons to about 100,000 Daltons, from about 950 Daltons to about 50,000 Daltons, from about 950 Daltons to about 25,000 Daltons, from about 950 Daltons to about 10,000 Daltons, from about 950 Daltons to about 5,000 Daltons, from about 950 Daltons to about 2500 Daltons, from about 1000 Daltons to about 10000 Daltons, from about 1500 Daltons to about 10000 Daltons, from about 2000 Daltons to about 10000 Daltons, from about 2500 Daltons to about 10000 Daltons, from about 3000 Daltons to about 10000 Daltons, from about 4000 Daltons to about 10000 Daltons, or from about 5000 Daltons to about 10000 Daltons.

The high molecular weight, structured multiesters and/or multiethers of a polyol can have a molecular weight greater than about 900 Daltons, greater than about 1000 Daltons, greater than about 1500 Daltons, greater than about 2000 Daltons, or greater than about 2500 Daltons.

The high molecular weight, structured surfactant can be a fatty acid, an ester of a fatty acid, an alcohol, an alkylated alcohol, an oxalkylated alcohol, an alkylated polyol, an oxyalkylated polyol, an alkylated amine, an oxyalkylated amine, an alkylated polyamine, an oxyalkylated polyamine, an alkylated amide, an oxyalkylated amide, an alkylated polyamide, an oxyalkylated polyamide, an alkylated sulfur-containing compound, an oxyalkylated sulfur-containing compound, an alkylated phosphorus-containing compound, an oxyalkylated phosphorus-containing compound, an alkylated silicone-based polymer, an oxyalkylated silicone-based polymer or a combination thereof.

In the methods for increasing recovery of crude oil from a subterranean hydrocarbon-containing formation described herein, the high molecular weight, structured multiester of a polyol can comprise a polyoxyethylene sorbitan dioleate, a polyoxyethylene sorbitan trioleate, a polyoxyethylene sorbitan tetraoleate, a polyoxypropylene sorbitan dioleate, a polyoxypropylene sorbitan trioleate, a polyoxypropylene sorbitan tetraoleate, a polyoxyethylene sorbitan distearate, a polyoxyethylene sorbitan tristearate, a polyoxyethylene sorbitan tetrastearate, a polyoxypropylene sorbitan distearate, a polyoxypropylene sorbitan tristearate, a polyoxypropylene sorbitan tetrastearate, sorbitol trioleate, sorbitol tetraoleate, sorbitol pentaoleate, sorbitol hexaoleate, sorbitol tristearate, sorbitol tetrastearate, sorbitol pentastearate, sorbitol hexastearate, a polyoxyethylene sorbitol dioleate, a polyoxyethylene sorbitol trioleate, a polyoxyethylene sorbitol tetraoleate, a polyoxyethylene sorbitol pentaoleate, a polyoxyethylene sorbitol hexaoleate, a polyoxypropylene sorbitol dioleate, a polyoxypropylene sorbitol trioleate, a polyoxypropylene sorbitol tetraoleate, a polyoxypropylene sorbitol pentaoleate, a polyoxypropylene sorbitol hexaoleate, a polyoxyethylene sorbitol distearate, a polyoxyethylene sorbitol tristearate, a polyoxyethylene sorbitol tetrastearate, a polyoxyethylene sorbitol pentastearate, a polyoxyethylene sorbitol hexastearate, a polyoxypropylene sorbitol distearate, a polyoxypropylene sorbitol tristearate, a polyoxypropylene sorbitol tetrastearate, a polyoxypropylene sorbitol pentastearate, a polyoxypropylene sorbitol hexastearate, a copolymer of poly(12-hydroxystearic acid) and poly(ethylene oxide), or a combination thereof.

The structured multiethers of a polyol can comprise an alkylated polyglycerol, an oxyalkylated polyglycerol, an alkylated polyglycoside, an oxyalkylate polyglycoside, an alkylated polysaccharide, an oxyalkylated polysaccharide, or a combination thereof.

The emulsifying surfactant or surfactant blend can have a hydrophilic/lipophilic balance (HLB) of at least about 8, at least about 9, or at least about 10.

Further, the emulsifying surfactant or surfactant blend can have a HLB of from about 8 to about 19.5; from about 9 to about 19.5, or from about 10 to about 19.5.

The emulsifying surfactant can comprise a polyoxyethylene sorbitan trioleate, a copolymer of poly(12-hydroxystearic acid) and poly(ethylene oxide), a polyoxyethylene sorbitol hexaoleate, or a combination thereof.

The aqueous flooding fluid can further comprise a surfactant of sorbitan monooleate, sorbitan dioleate, sorbitan trioleate, or combination thereof.

The aqueous flooding fluid can further comprise a surfactant of sorbitan monostearate, sorbitan distearate, sorbitan tristearate or combination thereof.

In the methods for increasing recovery of crude oil from a subterranean hydrocarbon-containing formation described herein, the aqueous flooding fluid can further comprise a surfactant having a branched structure, a hyperbranched structure, a dendrimer structure, or a combination thereof.

In the methods described herein, the surfactant can be a nonionic surfactant, an anionic surfactant, a cationic surfactant, an amphoteric surfactant, or a combination thereof.

In the methods described herein, at least one of the surfactants can be an inverting surfactant.

When at least one of the surfactants is an inverting surfactant, the inverting surfactant has a hydrophilic/lipophilic balance (HLB) of at least about 8, at least about 9, or at least about 10.

Further, the inverting surfactant can have a HLB of from about 8 to about 19.5; from about 9 to about 19.5, or from about 10 to about 19.5.

In the methods for increasing recovery of crude oil from a subterranean hydrocarbon-containing formation described herein, when at least one of the surfactants is an inverting surfactant, the inverting surfactant has a hydrophilic/lipophilic balance (HLB) of greater than 10, preferably greater than 13.

When the mobility control agent comprises an emulsion of an aqueous phase and an oil phase, the aqueous phase comprises the cross-linked water-soluble polymer and the oil phase comprises a hydrocarbon oil and a surfactant, and the average aqueous droplet size in the emulsion is from about 0.01 micron to about 100 micron, from about 0.01 micron to about 50 micron, from about 0.01 micron to about 40 micron, from about 0.01 micron to about 30 micron, from about 0.01 micron to about 20 micron, from about 0.01 micron to about 10 micron, from about 0.01 micron to about 5 micron, or from about 0.01 micron to about 1 micron, or from about 0.01 micron to about 0.1 micron.

In the methods for increasing recovery of crude oil from a subterranean hydrocarbon-containing formation described herein, when the mobility control agent comprises an emulsion of an aqueous phase and an oil phase, the aqueous phase comprises the cross-linked water-soluble polymer and the oil phase comprises a hydrocarbon oil and a surfactant, the average aqueous droplet size in the emulsion is less than about 5 microns, less than about 4 microns, less than about 3 microns, less than about 2 microns, or less than about 1 micron, or less than about 0.1 micron.

The hydrocarbon oil can be a mineral oil, a biodiesel oil, an organic solvent, or the like.

The mobility control agent can be a low-viscosity solution resistant to viscosity degradation induced by the high shear experienced during the injection. But, once injected, the higher temperature and the longer residence time within the subterranean formation facilitates hydrolysis of the cross-linkers, which leads to an increase in viscosity of the solution, due to the increase in the hydrodynamic volume of the mobility control agents (cross-linked water-soluble polymers) that are un-cross-linked following hydrolysis. The viscosity of the resulting solution is equivalent or higher than that of a solution comprising a near-identical polymer that lacks the labile cross-links. The higher viscosity of the solution once in the formation allows for its effective use in achieving mobility control of the hydrocarbon in the formation, enhancing the secondary/tertiary recovery of hydrocarbon from the formation. The compositions of the invention thereby provide viscosities in formations after heat/time hydrolysis activation that far exceed those of previous hydrocarbon recovery polymers, which can degrade much more rapidly under the influence of shear during introduction via the wellbore.

Water-soluble Polymers

The methods described herein comprise injection of a mobility control agent comprising a cross-linked water-soluble polymer. The cross-linked water-soluble polymers can comprise thermally labile, catalytically labile, enzymatically labile, redox labile, optically labile, pH labile, aging time labile, biologically labile, hydrophobically labile, hydrolytically labile, or electrolytically labile cross-links. In addition, the cross-linking may be provided by physical entanglements of the polymer chains that are subject to disentanglement once the polymer enters the reservoir.

The polymer emulsion can be produced starting from a monomer emulsion that is polymerized to form the water soluble polymer. The starting monomer emulsion is prepared by any suitable means, for example by use of emulsifying surfactants (optionally assisted by high shear mixing), or by phase inversion emulsification. Typically, the monomer emulsion is a water-in-oil emulsion, but an oil-in-water emulsion, bicontinuous emulsion, a triple emulsion, a multiple emulsion or any combination thereof may also be used. The end result after polymerization of the starting monomer emulsion is a water-in-oil emulsion or microsuspension of water-swelled polymer beads suspended in the continuous oil phase. The polymer emulsion may be macroemulsion, nanoemulsion, microemulsion, or a combination thereof. The polymer emulsion is applied by diluting it into the injection water and then pumping it into the oil-bearing reservoir. Typically, the polymer emulsion is "inverted," or converted into a water-continuous emulsion with the aid of a high HLB surfactant and high shear, during the dilution process. This "inversion" step is not necessary, however, if the properties of the product emulsion allow it to propagate through the reservoir without it first being inverted. In this latter case, the emulsion might be expected to invert in the reservoir, triggering an increase in the viscosity of the injected fluid.

The water soluble polymer can be a synthetic polymer, or it can be a biopolymer. A common synthetic polymer used as a mobility control polymer is an anionic, high molecular weight polyacrylamide, produced by the copolymerization of acrylamide with an anionic monomer such as sodium acrylate or sodium 2-acrylamido-2-methylpropanesulfonate. An example of a biopolymer that has been used as a mobility control polymer is xanthan. Other biopolymers such as diutan or schizophyllan might also be used as mobility control polymers.

The mobility control polymer can also have a cross-linking monomer that is triggered by a pH change (i.e., pH labile). A pH-triggered cross-linker can contain an alkylboronic acid functional group in the cross-linker. Alkylboronic acids, arylboronic acids, and alkenylboronic acids, along with borate salts, form borate esters at high pH with polymers containing at least one diol or 1,2-vicinyl diols, or with a polyol as a cross-linker, and thus they may serve as pH-triggered cross-links. If the reservoir pH is about 7 or below, for example, the borate ester cross-link will decompose by hydrolysis. 4-Vinylphenylboronic acid is an example of a monomer that can be incorporated into polymer to serve as a polymeric, pH-triggered cross-linker that will form cross-links with 1,2-diol-containing biopolymers.

Further, ionically cross-linked polymers can also be prepared from standard mobility control polymers by combining them with an ionic cross-linker that will cross-link the polymer in such a way that the cross-links will be dissociated or broken once the polymer/ionic cross-linker is injected into the formation. The amount of cross-linker and the cross-linker/polymer ratio can be adjusted so that the ionic cross-links are stable in the product form of the polymer or are formed as the polymer is injected into the formation, but are unstable and break down once the polymer passes the shear points during injection and enters the reservoir. The cross-link instability in this case will be triggered by a change in the cross-linker/polymer environment upon injection (i.e., a change in concentration, salinity, temperature, pH, etc.). Examples of ionic cross-linkers that might be used in this way include multivalent metal ions such as zirconium, chromium, calcium, lithium, cerium, and aluminum or polyelectrolytes such as water soluble polymers possessing cationic charges (i.e., a cationic polyamine (poly EPI-DMA) or a polydiallyl dimethylammonium chloride (polyDADMAC). Examples of such polymers include, but are not limited to, polymers produced from amine-containing monomers such as N,N-dimethylamine, aziridine, N,N-dimethylaminoethyl acrylate or a quaternized salt thereof, N,N-dimethylaminoethyl methacrylate or a quaternized salt thereof, N,N-dimethylaminoethyl methacrylate or a quaternized salt thereof, N,N-dimethylaminopropyl acrylamide or a quaternized salt thereof, N,N-dimethylaminopropyl methacrylamide or a quaternized salt thereof, N,N-dimethyldiallylammonium chloride, N,N-diallylamine Under appropriate conditions, These types of ionic cross-linkers will form ionic cross-links with typical anionic polyacrylamide mobility control polymers by complexation or coulombic interaction. For example, a mixture of a poly(acrylamide/sodium acrylate) copolymer at a concentration of about 100 to 10,000 ppm may form suitable crosslinks in sea water with zirconium at a concentration of about 3-300 ppm.

Particularly, the labile cross-linked monomer units are broken upon exposure to a stimulus, such as a change in temperature or chemical environment (e.g., pH, concentration, or ionic strength). For example, the water-soluble polymers can be incorporated into the aqueous flooding fluid, and can undergo hydrolysis after the aqueous flooding fluid is introduced into the subterranean hydrocarbon-containing formation. The labile cross-linked monomer units can be cross-linked via a covalent hydrolyzable cross-linker, or via ionic interactions between a monomer unit bearing a charged hydrolyzable moiety and a monomer unit bearing an opposite charge or by hydrophobic interactions introduced by use of a hydrolytically labile hydrophobic monomer.

When the polymers are dissolved in aqueous solution, they provide the aqueous polymer solution with significant shear resistance and also a relatively low viscosity. If the aqueous solution is subjected to altered conditions, such as introduction into a subterranean formation or to increased temperatures, the viscosity can increase to an amount greater than the starting solution viscosity, or an amount greater than the viscosity of an aqueous solution comprising the same polymer lacking the hydrolyzable cross-links.

The water-soluble polymers of the present invention can comprise about 1 mol % to about 99 mol % acrylamide monomer units. For example, the polymer can comprise about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98 or 99 mol % acrylamide monomers. The water-soluble polymers can comprise about 20 mol % to about 80 mol % acrylamide monomers. Further, the water-soluble polymers comprise about 60 mol % to about 80 mol % acrylamide monomers.

The water-soluble polymer can comprise additional monomer units, which can be selected from the group consisting of: acrylic acid or a salt thereof, methacrylic acid or a salt thereof, 2-acrylamido-2-methylpropane sulfonic acid or a salt thereof, acrolein, styrene sulfonic acid or a salt thereof, N-vinyl formamide, N-vinyl pyrrolidone, N,N-dimethylaminoethyl acrylate or a quaternized salt thereof, N,N-dimethylaminoethyl methacrylate or a quaternized salt thereof, N,N-dimethylaminopropyl acrylamide or a quaternized salt thereof, N,N-dimethylaminopropyl methacrylamide or a quaternized salt thereof, N,N-dimethyldiallylammonium chloride, N,N-diallylamine, and a hydrophobic monomer such as lauryl methacrylate. For example, the water-soluble copolymer can further comprise monomer units selected from the group consisting of acrylic acid or a salt thereof, 2-acrylamido-2-methylpropane sulfonic acid or a salt thereof, 2-acrylamido-tertbutyl sulfonic acid (ATBS) or a salt thereof, acrolein, dimethylaminoethylacrylate methyl chloride quaternary salt (DMAEA.MCQ), and dimethylaminoethylmethacrylate methyl chloride quaternary salt (DMAEM.MCQ).

If present, each of the monomer units described herein can be included in a polymer in an amount of about 1 mol % to about 99 mol %. For example, the polymer can comprise about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98 or 99 mol % of the above monomer units. The water-soluble polymers can comprise about 10 mol % to about 60 mol % of the above monomer units. The water-soluble polymers can comprise about 20 mol % to about 40 mol % of the above monomer units.

The water-soluble polymer can be a homopolymer (e.g., a homopolymer of acrylamide), or a copolymer or a terpolymer. In the case of copolymers and terpolymers, the polymer can be any form of copolymer or terpolymer, such as an alternating copolymer, a periodic copolymer, a random copolymer, or a block copolymer (e.g., a diblock copolymer or a triblock copolymer).

The polymer can be a linear polymer or a branched polymer (e.g., a hyperbranched polymer or a dendritic polymer).

Following exposure of a solution comprising the water-soluble polymer to an external stimulus such as an increase in temperature or a change in chemical environment such as pH, concentration, or ionic strength (e.g., following injection into a subterranean formation), and hydrolysis of any cross-linked monomer units, the water-soluble polymer of the invention can have a molecular weight of greater than about 500 kDa, or from about 500 kDa to about 50000 kDa, or from about 1000 kDa to about 25000 kDa. For example, a water-soluble polymer can have a molecular weight of about 500 kDa, 600 kDa, 700 kDa, 800 kDa, 900 kDa, 1000 kDa, 1100 kDa, 1200 kDa, 1300 kDa, 1400 kDa, 1500 kDa, 1600 kDa, 1700 kDa, 1800 kDa, 1900 kDa, 2000 kDa, 2100 kDa, 2200 kDa, 2300 kDa, 2400 kDa, 2500 kDa, 2600 kDa, 2700 kDa, 2800 kDa, 2900 kDa, 3000 kDa, 3100 kDa, 3200 kDa, 3300 kDa, 3400 kDa, 3500 kDa, 3600 kDa, 3700 kDa, 3800 kDa, 3900 kDa, 4000 kDa, 4100 kDa, 4200 kDa, 4300 kDa, 4400 kDa, 4500 kDa, 4600 kDa, 4700 kDa, 4800 kDa, 4900 kDa, 5000 kDa, 5100 kDa, 5200 kDa, 5300 kDa, 5400 kDa, 5500 kDa, 5600 kDa, 5700 kDa, 5800 kDa, 5900 kDa, 6000 kDa, 6100 kDa, 6200 kDa, 6300 kDa, 6400 kDa, 6500 kDa, 6600 kDa, 6700 kDa, 6800 kDa, 6900 kDa, 7000 kDa, 7100 kDa, 7200 kDa, 7300 kDa, 7400 kDa, 7500 kDa, 7600 kDa, 7700 kDa, 7800 kDa, 7900 kDa, 8000 kDa, 8100 kDa, 8200 kDa, 8300 kDa, 8400 kDa, 8500 kDa, 8600 kDa, 8700 kDa, 8800 kDa, 8900 kDa, 9000 kDa, 9100 kDa, 9200 kDa, 9300 kDa, 9400 kDa, 9500 kDa, 9600 kDa, 9700 kDa, 9800 kDa, 9900 kDa, 10000 kDa, 11000 kDa, 12000 kDa, 13000 kDa, 14000 kDa, 15000 kDa, 16000 kDa, 17000 kDa, 18000 kDa, 19000 kDa, 20000 kDa, 21000 kDa, 22000 kDa, 23000 kDa, 24000 kDa, 25000 kDa, 26000 kDa, 27000 kDa, 28000 kDa, 29000 kDa, 30000 kDa, 31000 kDa, 32000 kDa, 33000 kDa, 34000 kDa, 35000 kDa, 36000 kDa, 37000 kDa, 38000 kDa, 39000 kDa, 40000 kDa, 41000 kDa, 42000 kDa, 43000 kDa, 44000 kDa, 45000 kDa, 46000 kDa, 47000 kDa, 48000 kDa, 49000 kDa or 50000 kDa. Molecular weights can be higher than 50000 kDa in the event of that some of the cross-links remain unhydrolyzed.

Following injection into a subterranean hydrocarbon-containing formation and hydrolysis of any cross-linked monomer units, the water-soluble polymer of the invention can have a charge level (e.g., an anionic charge level) of about 10 to about 75 mol %. For example, a water-soluble polymer can have a charge level of about 10 mol %, 11 mol %, 12 mol %, 13 mol %, 14 mol %, 15 mol %, 16 mol %, 17 mol %, 18 mol %, 19 mol %, 20 mol %, 21 mol %, 22 mol %, 23 mol %, 24 mol %, 25 mol %, 26 mol %, 27 mol %, 28 mol %, 29 mol %, 30 mol %, 31 mol %, 32 mol %, 33 mol %, 34 mol %, 35 mol %, 36 mol %, 37 mol %, 38 mol %, 39 mol %, 40 mol %, 41 mol %, 42 mol %, 43 mol %, 44 mol %, 45 mol %, 46 mol %, 47 mol %, 48 mol %, 49 mol %, 50 mol %, 51 mol %, 52 mol %, 53 mol %, 54 mol %, 55 mol %, 56 mol %, 57 mol %, 58 mol %, 59 mol %, 60 mol %, 61 mol %, 62 mol %, 63 mol %, 64 mol %, 65 mol %, 66 mol %, 67 mol %, 68 mol %, 69 mol %, 70 mol %, 71 mol %, 72 mol %, 73 mol %, 74 mol %, or 75 mol %. The water-soluble polymers can have a charge level of about 10 mol % to about 60 mol %. Particularly, the water-soluble polymers can have a charge level of about 10 mol % to about 40 mol %.

The water-soluble polymers can include monomer units that are cross-linked via an ionic interaction, between a monomer unit bearing a charged hydrolyzable moiety, and a monomer unit bearing an opposite charge. For example, ionically cross-linked monomer units can include a monomer unit bearing a hydrolyzable positively charged moiety, such as a quaternary amine, which interacts with a negatively charged moiety on the polymer. Also, ionically cross-linked monomer units can include a monomer unit bearing a hydrolyzable negatively charged moiety, such as a carboxylic acid, which interacts with a positively charged moiety on the polymer such as a quaternary amine.

For example, the water-soluble polymer can comprise at least one monomer-derived unit having the following formula (I):

The group, A can be O.
Alternatively, A can be NH.
The group, B, can be $C_2$ alkylenyl (i.e. —$CH_2$—$CH_2$—).
Alternatively, the group, B, can comprise at least one ethylene glycol (i.e. —O—$CH_2$—$CH_2$—O—) or propylene glycol (i.e. —O—$CH_2$—$CH_2$—$CH_2$—O—) moiety.
Each $R^a$ can be —$CH_3$.
The anion, $Z^{\ominus}$, can be any suitable anion, such as a halide (e.g., fluoride, chloride, bromide or iodide), acetate, benzenesulfonate, benzoate, bicarbonate, nitrate, methanesulfonate, p-toluenesulfonate, or the like. Preferably, $Z^{\ominus}$ can be chloride or methanesulfonate.

Exemplary hydrolyzable monomer units that include positively charged moieties are N,N-dimethylaminoethyl acrylate methyl chloride quaternary salt (DMAEA.MCQ), N,N-dimethylaminoethyl methacrylate methyl chloride quaternary salt (DMAEM.MCQ), N,N-dimethylaminopropyl acrylamide methyl chloride quaternary salt, and N,N-dimethylaminopropyl methacrylamide methyl chloride quaternary salt.

As an example of a hydrolyzable ionic cross-link, a monomer unit that is a DMAEA.MCQ or DMAEM.MCQ monomer unit can interact with an acrylate monomer unit to form an ionic cross-link. The ester moiety of the DMAEA.MCQ or DMAEM.MCQ can undergo hydrolysis to release the positively charged quaternary salt group, thereby breaking the cross-link.

Ionically cross-linked polymers can be prepared by polymerizing a mixture of monomers, which includes monomers bearing a charged hydrolyzable moiety, and monomer units bearing an opposite charge. For example, a polymer can be prepared by polymerizing a mixture comprising acrylamide monomers, acrylate monomers (e.g., sodium acrylate), and monomers having the following formula (Ia):

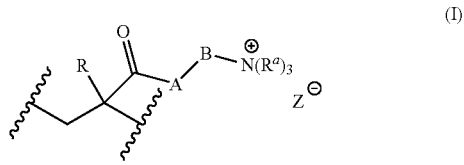

(I)

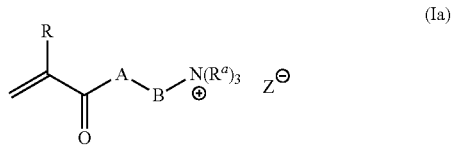

(Ia)

wherein:
R is selected from the group consisting of —H, $C_1$-$C_{24}$ alkyl, $C_2$-$C_{24}$ alkenyl and $C_2$-$C_{24}$ alkynyl;
each $R^a$ is independently selected from the group consisting of —H, optionally substituted $C_1$-$C_{50}$ alkyl, optionally substituted $C_2$-$C_{50}$ alkenyl, optionally substituted $C_2$-$C_{50}$ alkynyl and optionally substituted aryl;
A is selected from the group consisting of O, S and $NR^b$;
$R^b$ is selected from the group consisting of —H, optionally substituted $C_1$-$C_{24}$ alkyl, optionally substituted $C_2$-$C_{24}$ alkenyl and optionally substituted $C_2$-$C_{24}$ alkynyl;
B is selected from the group consisting of optionally substituted $C_1$-$C_{24}$ alkylenyl, optionally substituted $C_2$-$C_{24}$ alkenylenyl, optionally substituted $C_2$-$C_{24}$ alkynylenyl and optionally substituted $C_2$-$C_{24}$ heteroalkylenyl;
$Z^{\ominus}$ is an anion; and
each ⁓ represents a point of attachment to the polymer backbone.
The group, R, can be —H.
Alternatively, the group, R, can be —$CH_3$.

wherein:
R is selected from the group consisting of —H, $C_1$-$C_{24}$ alkyl, $C_2$-$C_{24}$ alkenyl and $C_2$-$C_{24}$ alkynyl;
each $R^a$ is independently selected from the group consisting of —H, optionally substituted $C_1$-$C_{50}$ alkyl, optionally substituted $C_2$-$C_{50}$ alkenyl, optionally substituted $C_2$-$C_{50}$ alkynyl and optionally substituted aryl;
A is selected from the group consisting of O, S and $NR^b$;
$R^b$ is selected from the group consisting of —H, optionally substituted $C_1$-$C_{24}$ alkyl, optionally substituted $C_2$-$C_{24}$ alkenyl and optionally substituted $C_2$-$C_{24}$ alkynyl;
B is selected from the group consisting of optionally substituted $C_1$-$C_{24}$ alkylenyl, optionally substituted $C_2$-$C_{24}$ alkenylenyl, optionally substituted $C_2$-$C_{24}$ alkynylenyl and optionally substituted $C_2$-$C_{24}$ heteroalkylenyl;
$Z^{\ominus}$ is an anion.
The group, R, can be —H.
Alternatively, R can be —$CH_3$.
The group, A can be O.
Alternatively, A can be NH.
The group, B, can be $C_2$ alkylenyl (i.e. —$CH_2$—$CH_2$—).

The group, B, can comprise at least one ethylene glycol (i.e. —O—CH$_2$—CH$_2$—O—) or propylene glycol (i.e. —O—CH$_2$—CH$_2$—CH$_2$—O—) moiety.

Each R$^a$ can be —CH$_3$.

The anion, Z$^\ominus$, can be any suitable anion, such as a halide (e.g., fluoride, chloride, bromide or iodide), acetate, benzenesulfonate, benzoate, bicarbonate, nitrate, methanesulfonate, p-toluenesulfonate, or the like.

Preferably, Z$^\ominus$, is chloride or methanesulfonate.

Following polymerization to produce the ionically cross-linked polymer, the positively charged monomer units derived from the monomers of formula (Ia) will interact ionically with negatively charged monomer units derived from the acrylate monomers, to generate the ionic cross-link. When included in a water-soluble polymer, ionic cross-linked monomer units can be present in the polymer at an amount of about 1 mol % to about 25 mol %, or about 1 mol % to about 10 mol %, of the total monomer units in the polymer. For example, ionic cross-linked monomer units can be included in the polymer at an amount of about 1 mol %, 2 mol %, 3 mol %, 4 mol %, 5 mol %, 6 mol %, 7 mol %, 8 mol %, 9 mol %, 10 mol %, 11 mol %, 12 mol %, 13 mol %, 14 mol %, 15 mol %, 16 mol %, 17 mol %, 18 mol %, 19 mol %, 20 mol %, 21 mol %, 22 mol %, 23 mol %, 24 mol %, or 25 mol % of the total monomer units in the polymer.

The water-soluble polymers can include monomer units that are cross-linked via a covalent hydrolyzable cross-linker. As an example of a hydrolyzable covalent cross-linking, two monomer units can be cross-linked via a moiety that includes at least one hydrolyzable group such as an ester, carbonate, oxalate, acetal, hemiacetal, hemiaminal, or the like. The cross-linking moiety can include up to about 1000 member atoms, and can include linear and/or branched chains, ring structures, and optional substituents. Any suitable moiety capable of cross-linking two monomer units and having at least one hydrolyzable group can be used.

For example, the covalently cross-linked monomer units can have the following formula (II):

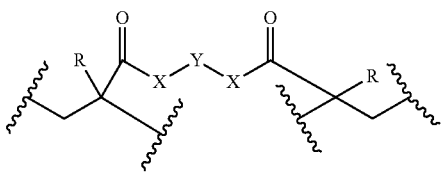

wherein:

each X is selected from the group consisting of O, S and NR$^b$;

each R$^b$ is independently selected from the group consisting of —H, optionally substituted C$_1$-C$_{24}$ alkyl, optionally substituted C$_2$-C$_{24}$ alkenyl and optionally substituted C$_2$-C$_{24}$ alkynyl;

each R is independently selected from the group consisting of —H, optionally substituted C$_1$-C$_{24}$ alkyl, optionally substituted C$_2$-C$_{24}$ alkenyl and optionally substituted C$_2$-C$_{24}$ alkynyl;

Y is selected from a group consisting of a bond and a linker comprising 1 to about 100 member atoms; and each ⌇⌇ represents a point of attachment to a first polymer backbone, and each ⌇⌇ represents a point of attachment to the first polymer backbone or a second polymer backbone.

Each X can be O. Also, each X can be NH.

The group, Y, can be a bond. The group, Y, can be a C$_1$-C$_{30}$ alkylenyl group. Y can comprise at least one oxalate group. Y can comprise at least one carbonate group. Y can comprise at least one ethylene glycol moiety (i.e. —OCH$_2$CH$_2$O—). Further, Y can comprise at least one propylene glycol moiety (i.e. —OCH$_2$CH$_2$CH$_2$O—).

For example, the covalently linked monomer units of formula (II) can have any of the following formulae:

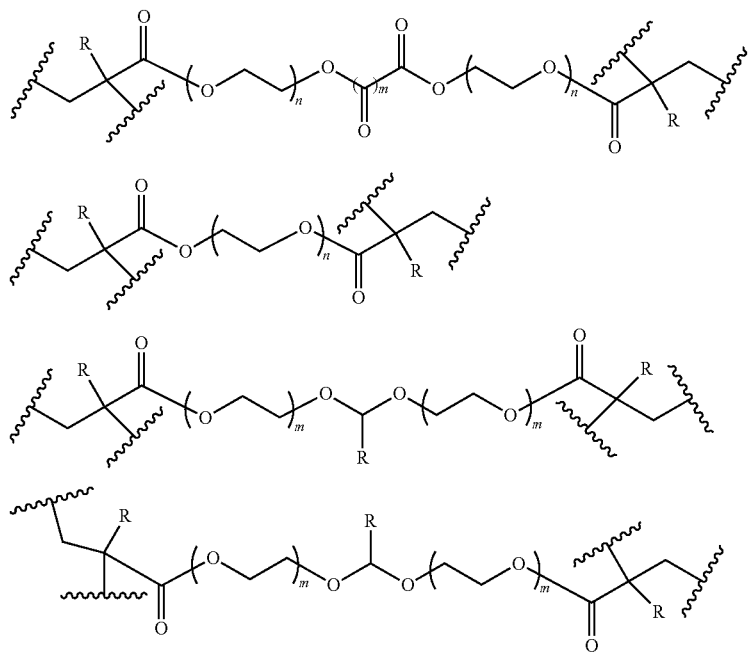

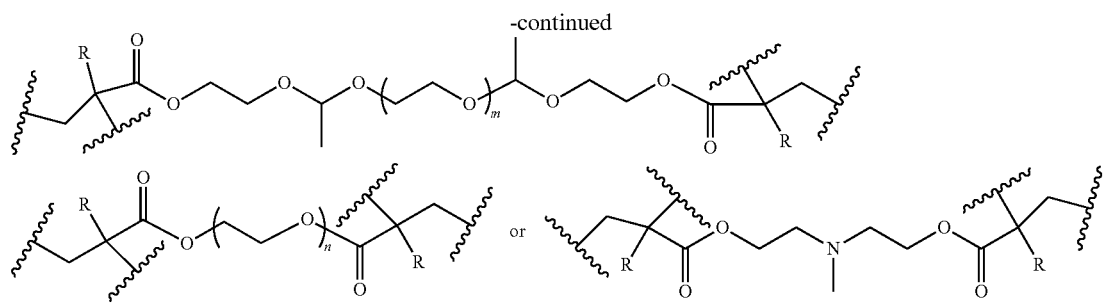

wherein each m is 1, 2, 3, 4, 5, 6, 7, 8, 9, 10, 11 or 12; each n is 0, 1, 2, 3, 4, 5, 6, 7, 8, 9, 10, 11, 12, 13, 14, 15, 16, 17, 18, 19, 20, 21, 22, 23, 24, 25, 26, 27, 28, 29 or 30; each p is 0 or 1; each R is independently selected from the group consisting of —H and —CH$_3$; and each R$^1$ is independently selected from the group consisting of —H and C$_1$-C$_{12}$ alkyl.

The covalently linked monomer units can have the following formula (IIa):

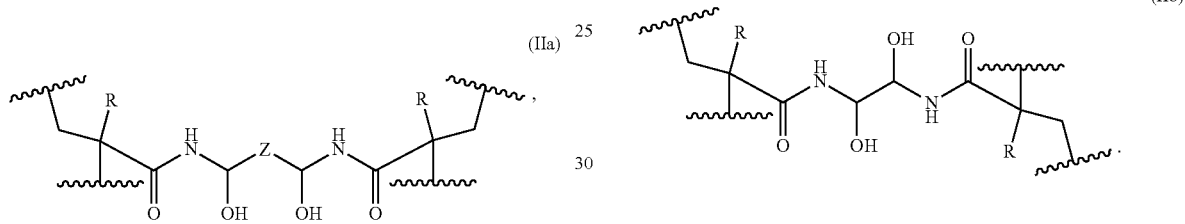

wherein:
each R is independently selected from the group consisting of —H and —CH$_3$;
Z is selected from the group consisting of a bond and a C$_1$-C$_{12}$ alkylenyl group; and
each ∿∿ represents a point of attachment to a first polymer backbone, and each ⋀⋀ represents a point of attachment to the first polymer backbone or a second polymer backbone.

In an embodiment of formula (IIa), the covalently linked monomer units can have the following formula (IIb):

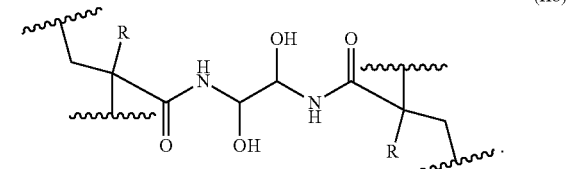

Other examples of cross-linked monomer units include those having phenylene groups, quaternary amine groups, carbonate groups, and the like. For example, covalently linked monomer units can have any of the following formulae:

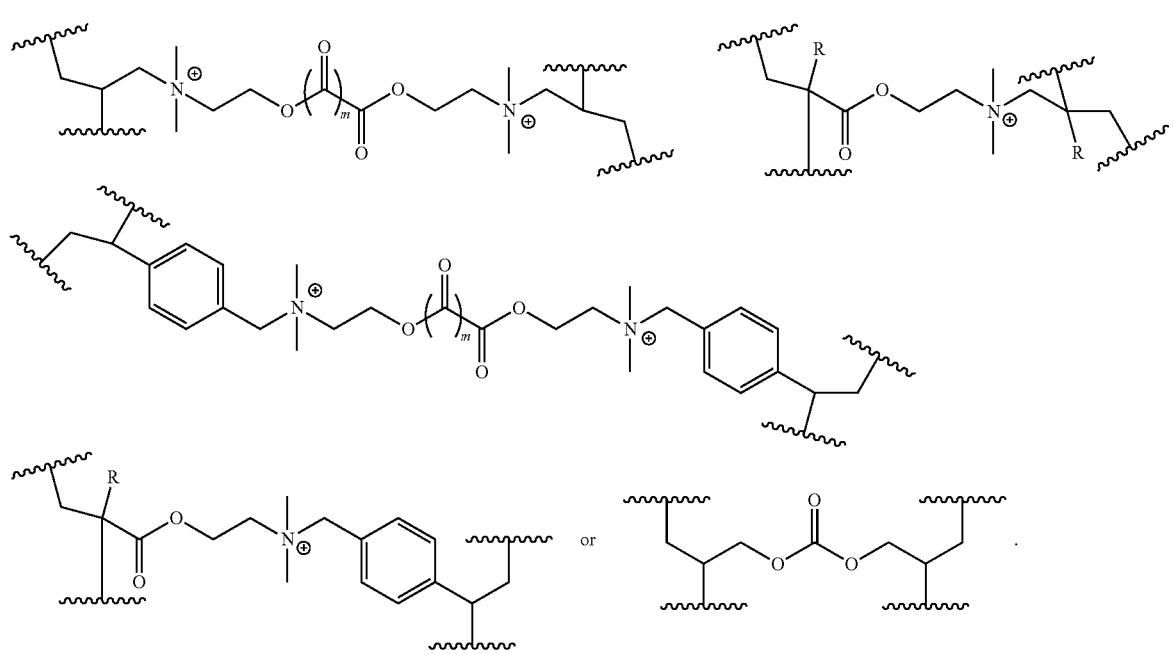

Other examples of cross-linked monomer units include those that provide more than two points of attachment to the backbone of the polymer chain. Examples of such cross-linked monomer units include the following:

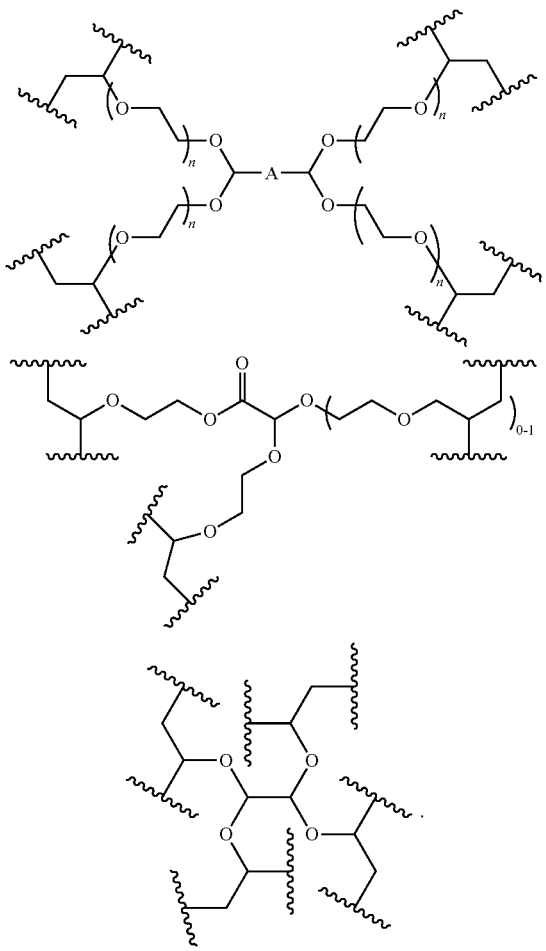

The above-identified cross-linked monomer units can be generated in a number of different ways. For example, two acrylamide or methacrylamide monomer units can be cross-linked by adding a dialdehyde compound to a solution of the polymer. A suitable dialdehyde compound includes, but is not limited to, glyoxal, glutaraldehyde, starch dialdehyde, or any compound having two or more aldehyde groups.

Alternatively, monomer units of the polymer can be cross-linked during the synthesis of the polymer, by including in the polymerization reaction a monomer having the following formula (III):

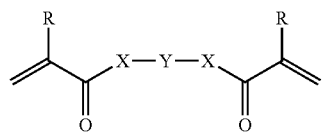

(III)

each X is selected from the group consisting of O, S and $NR^b$;

each $R^b$ is independently selected from the group consisting of —H, optionally substituted $C_1$-$C_{24}$ alkyl, optionally substituted $C_2$-$C_{24}$ alkenyl and optionally substituted $C_2$-$C_{24}$ alkynyl;

each R is independently selected from the group consisting of —H, optionally substituted $C_1$-$C_{24}$ alkyl, optionally substituted $C_2$-$C_{24}$ alkenyl and optionally substituted $C_2$-$C_{24}$ alkynyl; and Y is selected from a group consisting of a bond and a linker comprising 1 to about 100 member atoms.

The monomer of formula (III) can be formed immediately prior to the polymerization process, e.g., by adding a dialdehyde compound to a solution of an acrylamide or methacrylamide monomer immediately prior to the polymerization reaction. Alternatively, the monomer of formula (III) can be prepared in situ by adding a dialdehyde compound to a reaction mixture during the polymerization reaction.

An exemplary monomer unit can have the following formula (IIIa):

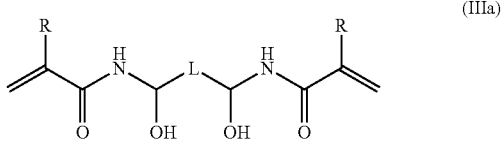

(IIIa)

wherein:
each R is independently selected from the group consisting of —H, optionally substituted $C_1$-$C_{24}$ alkyl, optionally substituted $C_2$-$C_{24}$ alkenyl and optionally substituted $C_2$-$C_{24}$ alkynyl; and L is selected from the group consisting of a bond and an optionally substituted $C_1$-$C_{12}$ alkylenyl group.

A particular example of a compound that can be included during synthesis of the polymer is N,N'-(1,2-dihydroxyethylene)bisacrylamide, also known as glyoxal bis(acrylamide). Glyoxal bis(acrylamide) can be added to the polymerization reaction, or it can be formed immediately prior to or during the polymerization process, by, for example, the addition of glyoxal to the polymerization reaction.

As another example, a direct hydrolyzable covalent bond can form between two monomer units. In such examples, a polymer having an acrylamide or methacrylamide monomer unit and an acrolein monomer unit can undergo a reaction to form a covalent bond, e.g., as follows:

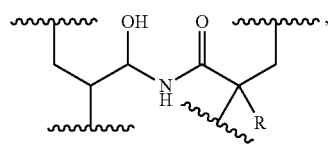

wherein R is selected from the group consisting of —H, optionally substituted $C_1$-$C_{24}$ alkyl, optionally substituted $C_2$-$C_{24}$ alkenyl and optionally substituted $C_2$-$C_{24}$ alkynyl, and each ⁀ represents a point of attachment to a first polymer backbone, and each ⁀ represents a point of attachment to the first polymer backbone or a second polymer backbone. R can be selected from the group consisting of —H and —$CH_3$.

The hydrolyzable covalently cross-linked monomer units are included in a polymer, either by including a bifunctional hydrolyzable monomer unit in the polymerization such as a compound of formula (III), or by adding a dialdehyde compound as a cross-linker, the cross-linked monomer units can be included in a polymer in an amount of about 0.1 ppm to about 20000 ppm based on the weight of the polymer. For example, the cross-linked monomer units can be included in a polymer in an amount of about 0.1 ppm to about 10000 ppm, about 0.1 ppm to about 5000 ppm, about 0.1 ppm to about 1000 ppm, or about 0.1 ppm to about 100 ppm. For example, the cross-linked monomer units can be included in a polymer in an amount of about 0.1 ppm, 0.2 ppm, 0.3 ppm, 0.4 ppm, 0.5 ppm, 0.6 ppm, 0.7 ppm, 0.8 ppm, 0.9 ppm, 1 ppm, 2 ppm, 3 ppm, 4 ppm, 5 ppm, 6 ppm, 7 ppm, 8 ppm, 9 ppm, 10 ppm, 20 ppm, 30 ppm, 40 ppm, 50 ppm, 60 ppm, 70 ppm, 80 ppm, 90 ppm, 100 ppm, 200 ppm, 300 ppm, 400 ppm, 500 ppm, 600 ppm, 700 ppm, 800 ppm, 900 ppm, 1000 ppm, 2000 ppm, 3000 ppm, 4000 ppm, 5000 ppm, 6000 ppm, 7000 ppm, 8000 ppm, 9000 ppm, 10000 ppm, 11000 ppm, 12000 ppm, 13000 ppm, 14000 ppm, 15000 ppm, 16000 ppm, 17000 ppm, 18000 ppm, 19000 ppm, or 20000 ppm.

The water-soluble polymers can be synthesized by any means known in the art, such as, for example, radical polymerization. For example, representative polymers can be prepared by the free radical polymerization of acrylamide and other vinyl monomers, including, optionally, a hydrolyzable cross-linking monomer (e.g., a compound of formula (Ia), or a compound of formula (III) or (IIIa), such as glyoxal bis(acrylamide)). Other additives can optionally be added, including ones that can form the desired hydrolyzable cross-links in the polymer prior to, during, or after the polymerization reaction.

Further, the polymer can be prepared in the form of the dry polymer, an oil-in-water emulsion polymer or as an inverse emulsion polymer.

The monomer solution can be suspended in a water-immiscible solvent such as a hydrocarbon oil, along with a high molecular weight, structured surfactant as described herein. Polymerization is then initiated via the addition of a small amount of a free radical initiator.

The free radical initiators generally decompose to generate free radicals by thermal, photochemical, redox, or hybrid mechanisms. An example of a thermal initiator includes, but is not limited to, azo compounds such as 2,2'-azobisisobutrynitrile. An example of a redox initiator includes, but is not limited to, t-butylhydroperoxide/ferrous ion and ammonium persulfate/sodium bisulfite.

The polymerization reaction is most often conducted between the temperatures of about 10° C. and about 110° C.

Once the polymerization reaction is completed, an optional step can be performed in order to reduce the residual monomer content of the product. This is accomplished, when desired, by means of heating the reaction product for an additional time period, or by the addition of additional initiators or other additives that will react with the residual monomer, or by a combination of both means. Additional processing steps can be optionally performed in order to, for example, adjust the product pH, or remove water or other solvents from the reaction product in order to produce a solid polymer product. The final polymer product form is thus dictated by the choice of the formula and the processing steps employed, so that a polymer product comprised of a liquid solution, a liquid emulsion, or a dry solid can be produced.

In an exemplary embodiment of formula (IIIa), the hydrolyzable cross-linker structure shown is comprised of a glyoxal-derived moiety and two acrylamide-derived moieties. This type of hydrolysable cross-link can be produced in the polymer by a variety of means, since the reaction used to form the cross-link can be carried out under reversible reaction conditions. For example, glyoxal bis(acrylamide) monomer, formed by a separate reaction between glyoxal and acrylamide, can be added as a comonomer to the polymerization reaction. Alternatively, glyoxal bis(acrylamide) can be formed in the polymerization reaction mixture immediately prior to polymerization, by the addition of glyoxal to the acrylamide-containing monomer reaction solution, under appropriate conditions.

Methods for Recovering Hydrocarbon Fluid from Subterranean Formations

The present invention is directed to a method for increasing recovery of a crude oil from a subterranean hydrocarbon-containing formation. The method comprises injecting into the formation an aqueous flooding fluid as described herein.

In order to effectively displace the crude oil from the subterranean hydrocarbon-containing formation using the methods discussed above, the aqueous flooding fluid has a sufficiently high viscosity. When injected into a subterranean formation, a low viscosity flooding fluid can seek a path of least resistance in the reservoir rock, and can therefore bypass large quantities of oil. By increasing the viscosity to a value approaching that of the oil, the mobility of the aqueous flooding fluid is decreased and more effectively displaces the oil from the formation. The aqueous flooding fluid of the present invention therefore comprises a high molecular weight water-soluble polymer which, once activated in the subterranean formation (as will be described further below), has a large hydrodynamic volume that exerts a primary influence on the bulk viscosity of the solution. The high bulk viscosity of the flooding fluid aids the displacement of the oil from the formation, ultimately into one or more production vessels.

While a high bulk viscosity is desirable once the aqueous flooding fluid is in the subterranean hydrocarbon-containing formation, high viscosity solutions are difficult to inject into the formation at a sufficiently high rate. Thus, the filterability of the aqueous flooding fluid is desirable as described above.

Furthermore, the water-soluble polymers can undergo significant shearing during the injection process, reducing the molecular weight and the hydrodynamic volume of the polymer, and the viscosity of the aqueous flooding fluid, which ultimately affects the displacement of oil. Thus, the aqueous flooding fluid comprises high molecular weight, shear-resistant polymers, which are temporarily cross-linked prior to injection of the aqueous flooding fluid into the subterranean formation. The emulsion droplet size advantageously affects the ability of the aqueous flooding fluid to be injected into the hydrocarbon-containing formation. These properties allow for greater ease of injection down the wellbore, and also impart significant shear resistance to the polymer.

Once the aqueous flooding fluid reaches the subterranean formations, the cross-links hydrolyze over time, and after exposure to higher temperatures in the formation the cross-links further hydrolyze so that the high molecular weight polymers become uncross-linked. The release of the cross-links results in an increase in the hydrodynamic volume, leading to a viscosity that is equal or greater than the viscosity of the aqueous flooding fluid prior to injection. The high viscosity aqueous flooding fluid can then effectively displace the hydrocarbons from the subterranean formation.

Aqueous Flooding Fluid

The aqueous flooding fluid used in the methods described herein comprises injection water and a mobility control agent. The mobility control agent comprises a cross-linked water-soluble polymer as described above.

The aqueous flooding fluid can have a viscosity of about 0 cPs to about 100 cPs before injection. After injecting the aqueous flooding fluid into the hydrocarbon-containing subterranean formation, the aqueous flooding fluid can have a viscosity of about 1 cPs to about 5000 cPs. This increase in viscosity is due to the degradation of the cross-linked water-soluble polymer to break the cross-links to result in a water-soluble polymer that is uncross-linked or have fewer cross-links than the cross-linked water-soluble polymer before injection.

The aqueous flooding fluid can comprise hydrolyzable cross-linked monomer units. The hydrolyzable cross-linked monomer units are hydrolyzed after the aqueous flooding fluid is injected into the hydrocarbon-containing subterranean formation, and the viscosity of the solution following hydrolysis is about the same or higher than a viscosity of the composition prior to injection.

The water-soluble polymer can be included in an aqueous flooding fluid in an amount of about 100 ppm to about 10000 ppm. For example, the polymer can be included in the aqueous flooding fluid in an amount of about 100 ppm, 200 ppm, 300 ppm, 400 ppm, 500 ppm, 600 ppm, 700 ppm, 800 ppm, 900 ppm, 1000 ppm, 1100 ppm, 1200 ppm, 1300 ppm, 1400 ppm, 1500 ppm, 1600 ppm, 1700 ppm, 1800 ppm, 1900 ppm, 2000 ppm, 2100 ppm, 2200 ppm, 2300 ppm, 2400 ppm, 2500 ppm, 2600 ppm, 2700 ppm, 2800 ppm, 2900 ppm, 3000 ppm, 3500 ppm, 4000 ppm, 4500 ppm, 5000 ppm, 5500 ppm, 6000 ppm, 6500 ppm, 7000 ppm, 7500 ppm, 8000 ppm, 8500 ppm, 9000 ppm, 9500 ppm, or 10000 ppm. In some embodiments, the water-soluble polymer can be included in an aqueous flooding fluid in an amount of about 100 ppm to about 3000 ppm.

Prior to injection into a subterranean formation, an aqueous flooding fluid can have a viscosity of about 0 cPs to about 100 cPs. For example, the aqueous flooding fluid can have a viscosity of about 0 cPs, 0.001 cPs, 0.01 cPs, 0.1 cPs, 0.2 cPs, 0.3 cPs, 0.4 cPs, 0.5 cPs, 0.6 cPs, 0.7 cPs, 0.8 cPs, 0.9 cPs, 1 cPs, 2 cPs, 3 cPs, 4 cPs, 5 cPs, 6 cPs, 7 cPs, 8 cPs, 9 cPs, 10 cPs, 15 cPs, 20 cPs, 25 cPs, 30 cPs, 35 cPs, 40 cPs, 45 cPs, 50 cPs, 55 cPs, 60 cPs, 65 cPs, 70 cPs, 75 cPs, 80 cPs, 85 cPs, 90 cPs, 95 cPs or 100 cPs. Further, the aqueous flooding fluid can have a viscosity of about 0.001 cPs to about 100 cPs; from about 0.01 cPs to about 100 cPs; or from about 0.1 cPs to about 20 cPs. Preferably, the aqueous flooding fluid can have a viscosity from about 0.1 cPs to about 10 cPs.

After exposure to a stimulus or a change in conditions such as temperature, pH, concentration, salt content or the like (e.g., injection into a subterranean formation, or addition to synthetic sea water), the viscosity of the aqueous flooding fluid can be about the same or higher than a viscosity of the aqueous flooding fluid prior to the stimulus, or the viscosity can be about the same or higher than the viscosity of an aqueous flooding fluid comprising a corresponding water-soluble polymer that lacks the hydrolyzable cross-links. For example, after injection, the aqueous flooding fluid can have a viscosity of about 1 cPs to about 5000 cPs, e.g., 1 cPs, 5 cPs, 10 cPs, 20 cPs, 30 cPs, 40 cPs, 50 cPs, 60 cPs, 70 cPs, 80 cPs, 90 cPs, 100 cPs, 150 cPs, 200 cPs, 250 cPs, 300 cPs, 350 cPs, 400 cPs, 450 cPs, 500 cPs, 550 cPs, 600 cPs, 650 cPs, 700 cPs, 750 cPs, 800 cPs, 850 cPs, 900 cPs, 950 cPs, 1000 cPs, 1100 cPs, 1200 cPs, 1300 cPs, 1400 cPs, 1500 cPs, 1600 cPs, 1700 cPs, 1800 cPs, 1900 cPs, 2000 cPs, 2100 cPs, 2200 cPs, 2300 cPs, 2400 cPs, 2500 cPs, 2600 cPs, 2700 cPs, 2800 cPs, 2900 cPs, 3000 cPs, 3100 cPs, 3200 cPs, 3300 cPs, 3400 cPs, 3500 cPs, 3600 cPs, 3700 cPs, 3800 cPs, 3900 cPs, 4000 cPs, 4100 cPs, 4200 cPs, 4300 cPs, 4400 cPs, 4500 cPs, 4600 cPs, 4700 cPs, 4800 cPs, 4900 cPs, or 5000 cPs.

Aqueous flooding fluids comprising the water-soluble polymers described above remain water-soluble following introduction into a subterranean formation. After injection into the formation, the environmental conditions of the formation cause the cross-links in the water-soluble polymers described above to hydrolyze, providing a viscous aqueous flooding fluid. In order for the aqueous flooding fluid to improve the mobility of the oil in the formation and improve the sweep efficiency of the aqueous polymer flood, the water-soluble polymer providing viscosity to the flooding fluid must be able to move unimpeded through the formation, without blocking the pores of the formation.

The mobility control agents, such as the water-soluble polymers described above, therefore remain water soluble and do not impede the flow of the aqueous flooding fluid in the formation. A recognized laboratory test to measure the ability of an aqueous flooding fluid to move through a subterranean formation without blocking the pores of the formation is called a filter ratio test. An example of this type of test is described in The American Petroleum Institute standards RP 63. In a filter ratio test, a standard volume of an aqueous flooding fluid containing a specific concentration of polymer is passed through a filter under a constant pressure. The time required for the solution to pass through the filter is recorded after specific volumes of solution have passed through the filter. The filter ratio is calculated as the ratio of the filter time for the final portion of solution, over the filter time for the initial, equal-sized portion of solution. Ideally, the aqueous flooding fluid should pass through the filter at a constant rate throughout the test, causing no pore-blocking during filtration, so that the filter ratio should be equal to one. The actual measured filter ratio is typically above one, however, so an upper limit to the filter ratio under a specific set of conditions is normally used in order to determine the suitability of an aqueous flooding fluid for use in a mobility control application.

The aqueous flooding fluid as injected into the well can have a filter ratio of from about 0.8 to about 1.5, from about 0.8 to about 1.2, from about 0.8 to about 1.2, from about 0.95 to about 1.5, from about 0.95 to about 1.2, from about 0.95 to about 1.2, from about 1 to about 1.5, from 1 to about 1.4, from 1 to about 1.3, from 1 to about 1.2, or from 1 to about 1.2 when the membrane filter size is 5 microns and the pressure is 20 psi.

The aqueous flooding fluid comprises the water-soluble polymers described above and exhibit enhanced shear resistance. Polymers used for mobility control in enhanced oil recovery are typically high molecular weight, non-cross-linked polymers that are sensitive to the shear forces experienced by the polymer-containing aqueous flooding fluid as it is injected into the formation, and as it travels into the formation near the wellbore. Any choke points in this high flow-velocity region can cause a shear-induced, mechanical degradation of the molecular weight of the polymer, resulting in an undesirable reduction in the viscosity of the aqueous flooding fluid. High molecular weight, viscous polymer solutions of the type desirable for mobility control are especially sensitive to shear degradation. Even if engineering measures are taken to minimize the shear degradation of the injected aqueous flooding fluid, a viscosity loss of up to 25% of the initial polymer viscosity upon shearing is not uncommon, and a much greater viscosity loss, up to about 80% or more, is possible.

The shear-induced degradation of the fluid viscosity can be measured using an industry recognized test such as that described in The American Petroleum Institute standards RP 63, where the aqueous flooding fluid is passed through a small orifice under high pressure. The difference in the fluid viscosity before and after the choke point is measured to indicate the amount of shear degradation of the flooding fluid viscosity. Alternatively, a simple Waring blender test can be used to induce the shear degradation of the aqueous flooding fluid. The amount of viscosity loss experienced at increasing shear times in the blender can be measured and used to determine the relative shear stability of flooding fluids comprised of different types of polymers.

The aqueous flooding fluids comprising the water-soluble polymers can display significant shear resistance. For example, when subjected to conditions of shear such as a blender test, the RP 63 standard test, or injection into a subterranean formation, the aqueous flooding fluids of the present invention can undergo a viscosity loss of less than 50%, less than 49%, less than 48%, less than 47%, less than 46%, less than 45%, less than 44%, less than 43%, less than 42%, less than 41%, less than 40%, less than 39%, less than 38%, less than 37%, less than 36%, less than 35%, less than 34%, less than 33%, less than 32%, less than 31%, less than 30%, less than 29%, less than 28%, less than 27%, less than 26%, less than 25%, less than 24%, less than 23%, less than 22%, less than 21%, less than 20%, less than 19%, less than 18%, less than 17%, less than 16%, less than 15%, less than 14%, less than 13%, less than 12%, less than 11%, less than 10%, less than 9%, less than 8%, less than 7%, less than 6%, less than 5%, less than 4%, less than 3%, less than 2%, or less than 1%.

In addition to the water-soluble polymer, an aqueous flooding fluid can further optionally include one or more additives. A suitable additive includes, but is not limited to, an asphaltene inhibitor, a paraffin inhibitor, a corrosion inhibitor, a scale inhibitor, an emulsifier, a water clarifier, a dispersant, an emulsion breaker, a hydrogen sulfide scavenger, a hydrogen sulfide scavenging enhancer, a gas hydrate inhibitor, a biocide, a pH modifier, a surfactant, an antioxidant, or a solvent.

The aqueous flooding fluid can further comprise a corrosion inhibitor. A suitable corrosion inhibitor includes, but is not limited to, an amidoamine, a quaternary amine, an amide, a phosphate ester, or a combination thereof The aqueous flooding fluid can further comprise a scale inhibitor. A suitable scale inhibitor includes, but is not limited to, a phosphate, a phosphate ester, a phosphoric acid, a phosphonate, a phosphonic acid, a polyacrylamide, a salt of acrylamido-methyl propane sulfonate/acrylic acid copolymer (AMPS/AA), a phosphinated maleic copolymer (PHOS/MA), a salt of a polymaleic acid/acrylic acid/acrylamido-methyl propane sulfonate terpolymer (PMA/AMPS), or a combination thereof The aqueous flooding fluid can further comprise an emulsifier. A suitable emulsifier includes, but is not limited to, a salt of a carboxylic acid, a product of an acylation reaction between a carboxylic acid or a carboxylic anhydride and an amine, an alkyl, an acyl or an amide derivative of a saccharide (an alkyl-saccharide emulsifier), or a combination thereof The aqueous flooding fluid can further comprise a water clarifier. A suitable water clarifier can include, but is not limited to, an inorganic metal salt such as alum, aluminum chloride, and aluminum chlorohydrate, or an organic polymer such as an acrylic acid based polymer, an acrylamide based polymer, a polymerized amine, an alkanolamine, a thiocarbamate, and a cationic polymer such as diallyldimethylammonium chloride (DADMAC).

The aqueous flooding fluid can further comprise a dispersant. A suitable dispersant can include, but is not limited to, an aliphatic phosphonic acid with 2-50 carbons, such as hydroxyethyl diphosphonic acid, and an aminoalkyl phosphonic acid, e.g. a polyaminomethylene phosphonate with 2-10 nitrogen atoms e.g. each bearing at least one methylene phosphonic acid group; examples of the latter are ethylenediamine tetra(methylene phosphonate), diethylenetriamine penta(methylene phosphonate) and the triamine- and tetramine-polymethylene phosphonates with 2-4 methylene groups between each nitrogen atom, at least two of the numbers of methylene groups in each phosphonate being different. Other suitable dispersion agents include lignin or a derivative of lignin such as lignosulfonate and naphthalene sulfonic acid and a derivative.

The aqueous flooding fluid can further comprise an emulsion breaker. A suitable emulsion breaker can include, but is not limited to, dodecylbenzylsulfonic acid (DDBSA), the sodium salt of xylenesulfonic acid (NAXSA), an epoxylated and propoxylated compound, an anionic surfactant, a cationic surfactant, a nonionic surfactant, a resin, such as a phenolic resin or epoxide resin.

The aqueous flooding fluid can further comprise a hydrogen sulfide scavenger. A suitable additional hydrogen sulfide scavenger can include, but is not limited to, an oxidant (e.g., an inorganic peroxide such as sodium peroxide, or chlorine dioxide), an aldehyde (e.g., of 1-10 carbons such as formaldehyde or glutaraldehyde or (meth)acrolein), a triazine (e.g., monoethanol amine triazine, and monomethylamine triazine), glyoxal, or a combination thereof. Adding monomethylamine (MMA) triazines can reduce or eliminate offensive MMA odors.

The aqueous flooding fluid can further comprise a gas hydrate inhibitor. A suitable gas hydrate inhibitor can include, but is not limited to, a thermodynamic inhibitor (THI), a kinetic inhibitor (KHI), an anti-agglomerate (AA), or a combination thereof. A suitable thermodynamic inhibitor can include, but is not limited to, a NaCl salt, a KCl salt, a $CaCl_2$ salt, a $MgCl_2$ salt, a $NaBr_2$ salt, a formate brine (e.g. potassium formate), a polyol (such as glucose, sucrose, fructose, maltose, lactose, gluconate, monoethylene glycol, diethylene glycol, triethylene glycol, mono-propylene glycol, dipropylene glycol, tripropylene glycol, tetrapropylene glycol, monobutylene glycol, dibutylene glycol, tributylene glycol, glycerol, diglycerol, triglycerol, a sugar alcohol (e.g. sorbitol, mannitol)), methanol, propanol, ethanol, a glycol ether (such as diethyleneglycol monomethyl ether, ethylene glycol monobutyl ether), an alkyl or cyclic ester of an alcohol (such as ethyl lactate, butyl lactate, methylethyl benzoate), or a combination thereof. A suitable kinetic inhibitor and an anti-agglomerate includes, but is not limited to, a polymer, a copolymers, a polysaccharide (such as hydroxy-ethylcellulose (HEC), carboxymethylcellulose (CMC), starch, starch derivatives, and xanthan), a lactam (such as polyvinylcaprolactam, polyvinyl lactam), a pyrrolidone (such as polyvinyl pyrrolidone of various molecular weights), a surfactant (such as a fatty acid salt, an ethoxylated alcohol, a propoxylated alcohol, a sorbitan ester, an ethoxylated sorbitan ester, a polyglycerol ester of a fatty acid, an alkyl glucoside, an alkyl polyglucoside, an alkyl sulfate, an alkyl sulfonate, an alkyl ester sulfonate, an alkyl aromatic sulfonate, an alkyl betaine, an alkyl amido betaine), a hydrocarbon based dispersant (such as a lignosulfonate, an iminodisuccinate, a polyaspartate), an amino acid, a proteins, or a combination thereof The aqueous flooding fluid can further comprise a biocide. Any biocide suitable in oilfield operations can be used. A biocide can be included in a composition in an amount of about 0.1 ppm to about 1000 ppm, e.g., 0.1 ppm, 0.5 ppm, 1 ppm, 2 ppm, 3 ppm, 4 ppm, 5 ppm, 6 ppm, 7 ppm, 8 ppm, 9 ppm, 10 ppm, 20 ppm, 30 ppm, 40 ppm, 50 ppm, 60 ppm, 70 ppm, 80 ppm, 90 ppm, 100 ppm, 200 ppm, 300 ppm, 400 ppm, 500 ppm, 600 ppm, 700 ppm, 800 ppm, 900 ppm, or 1000 ppm.

A suitable biocide includes, but is not limited to, an oxidizing or a non-oxidizing biocide. A suitable non-oxidizing biocide includes, for example an amine compound (e.g., a quaternary amine compound and cocodiamine), a halogenated compound (e.g., bronopol and 2-2-dibromo-3-nitrilopropionamide (DBNPA)), a sulfur compound (e.g., isothiazolone, a carbamate, and metronidazole), and a quaternary phosphonium salt (e.g., tetrakis(hydroxymethyl)phosphonium sulfate (THPS)). A suitable oxidizing biocide includes, for example, sodium hypochlorite, trichloroisocyanuric acid, dichloroisocyanuric acid, calcium hypochlorite, lithium hypochlorite, a chlorinated hydantoin, stabilized sodium hypobromite, activated sodium bromide, a brominated hydantoin, chlorine dioxide, ozone, a peroxide, or a combination thereof.

The aqueous flooding fluid can further comprise a pH modifier. A suitable pH modifier includes, but is not limited to, an alkali hydroxide, an alkali carbonate, an alkali bicarbonate, an alkaline earth metal hydroxide, an alkaline earth metal carbonate, an alkaline earth metal bicarbonate, or a combination thereof. Exemplary pH modifiers include NaOH, KOH, $Ca(OH)_2$, CaO, $Na_2CO_3$, $KHCO_3$, $K_2CO_3$, $NaHCO_3$, MgO, and $Mg(OH)_2$.

The aqueous flooding fluid can further comprise a surfactant. The surfactant can be a cationic surfactant, an anionic surfactant, an amphoteric surfactant, a zwitterionic surfactant, or a non-ionic surfactant. A surfactant can aid in improving the recovery of oil from the formation. A surfactant can be included in an aqueous flooding fluid in an amount of about 100 ppm to about 10000 ppm, e.g., 100 ppm, 200 ppm, 300 ppm, 400 ppm, 500 ppm, 600 ppm, 700 ppm, 800 ppm, 900 ppm, 1000 ppm, 2000 ppm, 3000 ppm, 4000 ppm, 5000 ppm, 6000 ppm, 7000 ppm, 8000 ppm, 9000 ppm, or 10000 ppm.

A suitable surfactant includes, but is not limited to, an anionic surfactant, a cationic surfactant, or a nonionic surfactant. An anionic surfactant can be an alkyl aryl sulfonate, an olefin sulfonate, a paraffin sulfonate, an alcohol sulfate, an alcohol ether sulfate, an alkyl carboxylate, an alkyl ether carboxylate, an alkyl and ethoxylated alkyl phosphate ester, a mono- and di-alkyl sulfosuccinate and sulfosuccinamate, an alkyl or alkyl ether sulfate and sulfonate, such as a $C_{14}$-$C_{24}$ alpha olefin sulfonate, a $C_{13}$-$C_{18}$ alcohol ether sulfate, a $C_{15}$-$C_{17}$ internal olefin sulfonate, or a $C_{12}$-$C_{18}$ ester sulfonate.

A cationic surfactant can be an alkyl trimethyl quaternary ammonium salt, an alkyl dimethyl benzyl quaternary ammonium salt, a dialkyl dimethyl quaternary ammonium salt, an imidazolinium salt, or a combination thereof A nonionic surfactant can be an alcohol alkoxylate, an alkylphenol alkoxylate, a block copolymer of ethylene, propylene and butylene oxide, an alkyl dimethyl amine oxide, an alkyl-bis(2-hydroxyethyl)amine oxide, an alkyl amidopropyl dimethyl amine oxide, an alkylamidopropylbis(2-hydroxyethyl)amine oxide, an alkyl polyglucoside, a polyalkoxylated glyceride, a sorbitan ester, a polyalkoxylated sorbitan ester, an alkyl polyethylene glycol ester and diester. Also included are a betaine and a sultane, an amphoteric surfactant such as an alkyl amphoacetate and an amphodiacetate, an alkyl amphopropionate and an amphodipropionate, an alkyliminodipropionate, or a combination thereof.

The aqueous flooding fluid can further comprise a solvent. A suitable solvent includes, but is not limited to, water, isopropanol, methanol, ethanol, 2-ethylhexanol, heavy aromatic naphtha, toluene, ethylene glycol, ethylene glycol monobutyl ether (EGMBE), diethylene glycol monoethyl ether, xylene, or a combination thereof. Representative polar solvents suitable for formulation with the composition include water, brine, seawater, an alcohol (including straight chain or branched aliphatic such as methanol, ethanol, propanol, isopropanol, butanol, 2-ethylhexanol, hexanol, octanol, decanol, 2-butoxyethanol, etc.), a glycol or a derivative (ethylene glycol, 1,2-propylene glycol, 1,3-propylene glycol, ethylene glycol monobutyl ether, etc.), a ketone (cyclohexanone, diisobutylketone), N-methylpyrrolidinone (NMP), N,N-dimethylformamide, and the like. A representative non-polar solvent suitable for formulation with the composition include an aliphatic such as pentane, hexane, cyclohexane, methylcyclohexane, heptane, decane, dodecane, diesel, and the like; an aromatic such as toluene, xylene, heavy aromatic naphtha, a fatty acid derivative (an acid, an ester, an amide), and the like.

The solvent can be monoethyleneglycol, methanol, dimethyl sulfoxide (DMSO), dimethylformamide (DMF), tetrahydrofuran (THF), or a combination thereof The aqueous flooding fluid can further comprise a compound that enhances the hydrogen sulfide scavenging performance of the composition. This compound can be a quaternary ammonium compound, an amine oxide, an ionic or non-ionic surfactant, or a combination thereof. A suitable quaternary amine compound can include, but is not limited to, alkyl benzyl ammonium chloride, benzyl cocoalkyl($C_{12}$-$C_{18}$)dimethylammonium chloride, dicocoalkyl ($C_{12}$-$C_{18}$)dimethylammonium chloride, ditallow dimethylammonium chloride, di(hydrogenated tallow alkyl)dimethyl quaternary ammonium methyl chloride, methyl bis(2-hydroxyethyl cocoalkyl($C_{12}$-$C_{18}$) quaternary ammonium chloride, dimethyl(2-ethyl) tallow ammonium methyl sulfate, n-dodecylbenzyldimethylammonium chloride, n-octadecylbenzyldimethyl ammonium chloride, n-dodecyltrimethylammonium sulfate, soya alkyltrimethylammonium chloride, hydrogenated tallow alkyl (2-ethylhyexyl)dimethyl quaternary ammonium methyl sulfate, or a combination thereof A suitable amine oxide compound can include, but is not limited to, a fatty amine oxide such as stearyl dimethylamine oxide, lauryldimethylamine oxide, cocamidopropylamine oxide, an etheramine oxide such as bis-(2-hydroxyethyl) isodecyloxypropylamine oxide, or a combination thereof. A suitable nonionic surfactant can include, but is not limited to, a polyoxyethylene glycol alkyl ether, a polyoxypropyleneglycol alkyl ether, a polyoxyethyleneglycol nonylphenol ether, a poloxamer, cocamide diethanolamine, polyethoxylated tallow amine, or a combination thereof These compounds can be present from about 0.01 to about 20 percent by weight, from about 1 to about 10 percent by weight, from about 2 to about 9 percent by weight, from about 3 percent to about 8 percent by weight, from about 4 percent to about 7 percent by weight, or from about 5 percent to about 6 percent by weight.

The hydrogen sulfide scavenging enhancer compound can be added to a fluid or gas simultaneously with the aqueous flooding fluid, or it can be added separately.

The aqueous flooding fluid can further comprise an asphaltene inhibitor. A suitable asphaltene inhibitor includes, but is not limited to, an aliphatic sulfonic acid; an alkyl aryl sulfonic acid; an aryl sulfonate; a lignosulfonate; an alkylphenol/aldehyde resin and a similar sulfonated resin; a polyolefin ester; a polyolefin imide; a polyolefin ester with an alkyl, alkylenephenyl or alkylenepyridyl functional group; a polyolefin amide; a polyolefin amide with an alkyl, alkylenephenyl or alkylenepyridyl functional group; a polyolefin imide with an alkyl, alkylenephenyl or alkylenepyridyl functional group; an alkenyl/vinyl pyrrolidone copolymer; a graft polymer of a polyolefin with maleic anhydride or vinyl imidazole; a hyperbranched polyester amide; a polyalkoxylated asphaltene, an amphoteric fatty acid, a salt of an alkyl succinate, a sorbitan monooleate, a polyisobutylene succinic anhydride, or a combination thereof.

The aqueous flooding fluid can further comprise a paraffin inhibitor. A suitable paraffin inhibitor includes, but is not limited to, a paraffin crystal modifier, a dispersant/crystal modifier combination, or a combination thereof. A suitable paraffin crystal modifier include, but is not limited to, an alkyl acrylate copolymer, an alkyl acrylate vinylpyridine copolymer, an ethylene vinyl acetate copolymer, a maleic anhydride ester copolymer, a branched polyethylene, naphthalene, anthracene, microcrystalline wax, an asphaltene, or a combination thereof. A suitable dispersant includes, but is not limited to, dodecyl benzene sulfonate, an oxyalkylated alkylphenol, an oxyalkylated alkylphenolic resin, or a combination thereof.

The aqueous flooding fluid can further comprise an antioxidant. Any antioxidant suitable in oilfield operations can be used. An exemplary antioxidant includes, but is not limited to a sulfite, a thiocyanate, a thiosulfate, or a combination there of. An antioxidant can be included in a composition in an amount of about 1 ppm to about 1000 ppm, e.g., 1 ppm, 2 ppm, 3 ppm, 4 ppm, 5 ppm, 6 ppm, 7 ppm, 8 ppm, 9 ppm, 10 ppm, 20 ppm, 30 ppm, 40 ppm, 50 ppm, 60 ppm, 70 ppm, 80 ppm, 90 ppm, 100 ppm, 200 ppm, 300 ppm, 400 ppm, 500 ppm, 600 ppm, 700 ppm, 800 ppm, 900 ppm, or 1000 ppm.

Compositions made according to the invention can further include additional functional agents or additives that provide a beneficial property. Additional agents or additives will vary according to the aqueous flooding fluid being manufactured and its intend use as one skilled in the art will appreciate.

The term "alkyl," as used herein, refers to a linear or branched hydrocarbon radical, preferably having 1, 2, 3, 4, 5, 6, 7, 8, 9, 10, 11, 12, 13, 14, 15, 16, 17, 18, 19, 20, 21, 22, 23, 24, 25, 26, 27, 28, 39, 30, 31, or 32 carbons. Alkyl groups include, but are not limited to, methyl, ethyl, n-propyl, isopropyl, n-butyl, iso-butyl, secondary-butyl, and tertiary-butyl. Alkyl groups can be unsubstituted or substituted by one or more suitable substituents, as defined below.

The term "alkylenyl" or "alkylene," as used herein, refers to a divalent group derived from a saturated, straight or branched hydrocarbon chain of from 1 to 50 carbon atoms. The term "$C_1$-$C_6$ alkylene" means those alkylene or alkylenyl groups having from 1 to 6 carbon atoms. Representative examples of alkylenyl groups include, but is not limited to, —$CH_2$—,—$CH(CH_3)$—, —$CH(C_2H_5)$—, —$CH(CH(CH_3)(C_2H_5))$—, $C(H)(CH_3)CH_2CH_2$—, —$C(CH_3)_2$—, —$CH_2CH_2$—, —$CH_2CH_2CH_2$—, —$CH_2CH_2CH_2CH_2$—, and —$CH_2CH(CH_3)CH_2$—. Alkylenyl groups can be unsubstituted or substituted by one or more suitable substituents, as defined below.

The term "alkenyl," as used herein, refers to a straight or branched hydrocarbon radical, preferably having 1, 2, 3, 4, 5, 6, 7, 8, 9, 10, 11, 12, 13, 14, 15, 16, 17, 18, 19, 20, 21, 22, 23, 24, 25, 26, 27, 28, 39, 30, 31, or 32 carbons, and having one or more carbon-carbon double bonds. An alkenyl group includes, but is not limited to, ethenyl, 1-propenyl, 2-propenyl (allyl), iso-propenyl, 2-methyl-1-propenyl, 1-butenyl, and 2-butenyl. Alkenyl groups can be unsubstituted or substituted by one or more suitable substituents, as defined below.

The term "alkenylenyl" or "alkenylene," as used herein, refers to a divalent group derived from a straight or branched chain hydrocarbon of 2 to 50 carbon atoms, which contains at least one carbon-carbon double bond. Representative examples of alkenylenyl groups include, but is not limited to, —$C(H)$=$C(H)$—, —$C(H)$=$C(H)$—$CH_2$—, —$C(H)$=$C(H)$—$CH_2$—$CH_2$—, —$CH_2$—$C(H)$=$C(H)$—$CH_2$—, —$C(H)$=$C(H)$—$CH(CH_3)$—, and —$CH_2$—$C(H)$=$C(H)$—$CH(CH_2CH_3)$—. Alkenylenyl groups can be unsubstituted or substituted by one or more suitable substituents, as defined below.

The term "alkynyl," as used herein, refers to a straight or branched hydrocarbon radical, preferably having 1, 2, 3, 4, 5, 6, 7, 8, 9, 10, 11, 12, 13, 14, 15, 16, 17, 18, 19, 20, 21, 22, 23, 24, 25, 26, 27, 28, 39, 30, 31, or 32 carbons, and having one or more carbon-carbon triple bonds. An alkynyl group includes, but is not limited to, ethynyl, propynyl, and butynyl. Alkynyl groups can be unsubstituted or substituted by one or more suitable substituents, as defined below.

The term "alkynylenyl" or "alkynylene," as used herein, refers to a divalent unsaturated hydrocarbon group derived from a straight or branched chain hydrocarbon of 2 to 50 carbon atoms, and which has at least one carbon-carbon triple bond. Representative examples of alkynylenyl groups include, but is not limited to, —C≡C—, —C≡C—$CH_2$—, —C≡C—$CH_2$—$CH_2$—, —$CH_2$—C≡C—$CH_2$—, —C≡C—$CH(CH_3)$—, and —$CH_2$—C≡C—$CH(CH_2CH_3)$—. Alkynylenyl groups can be unsubstituted or substituted by one or more suitable substituents, as defined below.

The term "alkoxy," as used herein, refers to an alkyl group, as defined herein, appended to the parent molecular moiety through an oxygen atom.

The term "aryl," as used herein, means monocyclic, bicyclic, or tricyclic aromatic radicals such as phenyl, naphthyl, tetrahydronaphthyl, indanyl and the like; optionally substituted by one or more suitable substituents, preferably 1 to 5 suitable substituents, as defined below.

The term "carbonyl," "(C=O)," or "—C(O)—" (as used in phrases such as alkylcarbonyl, alkyl —(C=O)— or alkoxycarbonyl) refers to the joinder of the >C=O moiety to a second moiety such as an alkyl or amino group (i.e. an amido group). Alkoxycarbonylamino (i.e. alkoxy(C=O)—NH—) refers to an alkyl carbamate group. The carbonyl group is also equivalently defined herein as (C=O). Alkylcarbonylamino refers to groups such as acetamide.

The term "cross-link," as used herein, refers to a bond that links one monomer unit of a polymer chain to another monomer unit of a polymer chain. The bond can be a covalent bond or an ionic bond.

The term "cycloalkyl," as used herein, refers to a mono, bicyclic or tricyclic carbocyclic radical (e.g., cyclopropyl, cyclobutyl, cyclopentyl, cyclohexyl, cycloheptyl, cyclooctyl, cyclononyl, cyclopentenyl, cyclohexenyl, bicyclo[2.2.1]heptanyl, bicyclo[3.2.1]octanyl and bicyclo[5.2.0]nonanyl, etc.); optionally containing 1 or 2 double bonds. Cycloalkyl groups can be unsubstituted or substituted by one or more suitable substituents, preferably 1 to 5 suitable substituents, as defined above.

The term "halo" or "halogen," as used herein, refers to a fluoro, chloro, bromo or iodo radical.

The term "heteroalkylenyl" or "heteroalkylene," as used herein, refers to a divalent group derived from a saturated, straight or branched hydrocarbon chain, in which at least one atom is a heteroatom such as O, S, N, Si or P. The terms "$C_1$-$C_{24}$ heteroalkylenyl," "$C_1$-$C_{12}$ heteroalkylenyl" and "$C_1$-$C_6$ heteroalkylene" refer to those heteroalkylene or heteroalkylenyl groups having from 1 to 24 atoms, 1 to 12 atoms or 1 to 6 member atoms, respectively, wherein the atoms are either carbon or a heteroatom. Representative examples of heteroalkylenyl groups include, but is not limited to, —O($CH_2CH_2O$)$_n$— and —O($CH_2CH_2CH_2O$)$_n$—, wherein each n is independently 1 to 12. Heteroalkylenyl groups can be unsubstituted or substituted by one or more suitable substituents, as defined below.

The term "heteroaryl," as used herein, refers to a monocyclic, bicyclic, or tricyclic aromatic heterocyclic group containing one or more heteroatoms selected from O, S and N in the ring(s). Heteroaryl groups include, but is not limited to, pyridyl, pyrazinyl, pyrimidinyl, pyridazinyl, thienyl, furyl, imidazolyl, pyrrolyl, oxazolyl (e.g., 1,3-oxazolyl, 1,2-oxazolyl), thiazolyl (e.g., 1,2-thiazolyl, 1,3-thiazolyl), pyrazolyl, tetrazolyl, triazolyl (e.g., 1,2,3-triazolyl, 1,2,4-triazolyl), oxadiazolyl (e.g., 1,2,3-oxadiazolyl), thiadiazolyl (e.g., 1,3,4-thiadiazolyl), quinolyl, isoquinolyl, benzothienyl, benzofuryl, and indolyl. Heteroaryl groups can be unsubstituted or substituted by one or more suitable substituents, preferably 1 to 5 suitable substituents, as defined below.

The term "heterocycle," as used herein, refers to a monocyclic, bicyclic, or tricyclic group containing 1 to 4 heteroatoms selected from N, O, S(O)$_n$, NH or NR$^x$, wherein R$^x$ is a suitable substituent. Heterocyclic groups optionally contain 1 or 2 double bonds. A heterocyclic group includes, but is not limited to, azetidinyl, tetrahydrofuranyl, imidazolidinyl, pyrrolidinyl, piperidinyl, piperazinyl, oxazolidinyl, thiazolidinyl, pyrazolidinyl, thiomorpholinyl, tetrahydrothiazinyl, tetrahydro-thiadiazinyl, morpholinyl, oxetanyl, tetrahydrodiazinyl, oxazinyl, oxathiazinyl, indolinyl, isoindolinyl, quinuclidinyl, chromanyl, isochromanyl, and benzoxazinyl. Examples of monocyclic saturated or partially saturated ring systems are tetrahydrofuran-2-yl, tetrahydrofuran-3-yl, imidazolidin-1-yl, imidazolidin-2-yl, imidazolidin-4-yl, pyrrolidin-1-yl, pyrrolidin-2-yl, pyrrolidin-3-yl, piperidin-1-yl, piperidin-2-yl, piperidin-3-yl, piperazin-1-yl, piperazin-2-yl, piperazin-3-yl, 1,3-oxazolidin-3-yl, isothiazolidinyl, 1,3-thiazolidin-3-yl, 1,2-pyrazolidin-2-yl, 1,3-pyrazolidin-1-yl, thiomorpholin-yl, 1,2-tetrahydrothiazin-2-yl, 1,3-tetrahydrothiazin-3-yl, tetrahydrothiadiazin-yl, morpholin-yl, 1,2-tetrahydrodiazin-2-yl, 1,3-tetrahydrodiazin-1-yl, 1,4-oxazin-2-yl, and 1,2,5-oxathiazin-4-yl. Heterocyclic groups can be unsubstituted or substituted by one or more suitable substituents, preferably 1 to 3 suitable substituents, as defined below.

The term "high molecular weight," as used herein in connection with a water-soluble polymer, refers to a polymer that has a molecular weight of at least about 500 kDa. In some embodiments, the term "high molecular weight" refers to a polymer that has a molecular weight of at least about 5000 kDa.

The term "hydrocarbon fluid," as used herein, refers to an organic compound consisting entirely of hydrogen and carbon. Hydrocarbons can be aromatic hydrocarbons (arenes), alkanes, alkenes, cycloalkanes and alkyne-based compounds. The majority of hydrocarbons found naturally occur in crude oil, where decomposed organic matter provides an abundance of carbon and hydrogen which, when bonded, can catenate to form seemingly limitless chains. Hydrocarbons can be saturated hydrocarbons (alkanes) composed entirely of single bonds and are saturated with hydrogen. The general formula for saturated hydrocarbons is $C_nH_{2n+2}$ (assuming non-cyclic structures). Saturated hydrocarbons are the basis of petroleum fuels and are found as either linear or branched species. Hydrocarbons with the same molecular formula, but different structural formulae are called structural isomers. As given in the example of 3-methylhexane and its higher homologues, branched hydrocarbons can be chiral. Chiral saturated hydrocarbons constitute the side chains of biomolecules such as chlorophyll and tocopherol. Hydrocarbons can be unsaturated hydrocarbons having one or more double or triple bonds between carbon atoms such as alkenes and alkynes as defined above. Hydrocarbons can be cycloalkanes, which are hydrocarbons containing one or more carbon rings to which hydrogen atoms are attached. Hydrocarbons can be aromatic hydrocarbons, also known as arenes, are hydrocarbons that have at least one aromatic ring. Hydrocarbons can be gases (e.g. methane and propane), liquids (e.g. hexane and benzene), waxes or low melting solids (e.g. paraffin wax and naphthalene) or polymers (e.g. polyethylene, polypropylene and polystyrene). Hydrocarbons can be a liquid hydrocarbon. The liquid hydrocarbon can be any type of liquid hydrocarbon including, but not limited to, crude oil, heavy oil, processed residual oil, bituminous oil, coker oils, coker gas oils, fluid catalytic cracker feeds, gas oil, naphtha, fluid catalytic cracking slurry, diesel fuel, fuel oil, jet fuel, gasoline, and kerosene.

The term "hydrodynamic volume," as used herein, refers to a measure of the size of the polymer in solution whereby the volume exerts a primary influence on the bulk viscosity of the solution of the polymer. Hydrodynamic volume can further refer to the volume of a polymer chain when it is in solution. This can vary for a polymer depending on how well it interacts with the solvent, and the polymer's molecular weight. The solvent properties can be influenced by the concentration and type of ionic species dissolved within the solvent.

The term "hydrolyzable," as used herein, refers to a bond or a moiety that can be cleaved by the addition of water.

The term "hydrolyzable cross-link," as used herein, refers to a cross-link as defined above that can be cleaved by hydrolysis (addition of water).

The term "hydroxy," as used herein, refers to an —OH group.

"Member atom" as used herein refers to a polyvalent atom (e.g., a C, O, N, S or P atom) in a chain or ring system that constitutes a part of the chain or ring. For example, in pyridine, five carbon atoms and one nitrogen atom are member atoms of the ring. In diethyl ether, four carbon atoms and one oxygen atom are member atoms of the chain. Member atoms will be substituted up to their normal valence. For example, in an alkylenyl chain, each carbon atom will be substituted with two hydrogen atoms, or one hydrogen atom and one other substituent (e.g., an alkyl group or a hydroxyl group), or two substituents (e.g., two alkyl groups). Alternatively, a carbon atom can be substituted with an oxo group to form a —C(O)— group.

The term "oxo," as used herein, refers to a double bonded oxygen (=O) radical wherein the bond partner is a carbon atom. Such a radical can also be thought as a carbonyl group.

The term "substituent," as used herein, is intended to mean a chemically acceptable functional group that is "substituted" at any suitable atom of that group. Suitable substituents include, but is not limited to halo groups, perfluoroalkyl groups, perfluoroalkoxy groups, alkyl groups, alkenyl groups, alkynyl groups, hydroxy groups, oxo groups, mercapto groups, alkylthio groups, alkoxy groups, aryl or heteroaryl groups, aryloxy or heteroaryloxy groups, aralkyl or heteroaralkyl groups, aralkoxy or heteroaralkoxy groups, HO—(C=O)— groups, heterocylic groups, cycloalkyl groups, amino groups, alkyl- and dialkylamino groups, carbamoyl groups, alkylcarbonyl groups, alkoxycarbonyl groups, alkylaminocarbonyl groups, dialkylamino carbonyl groups, arylcarbonyl groups, aryloxycarbonyl groups, alkylsulfonyl groups, arylsulfonyl groups, groups of formula —$(OCH_2)_tOH$ wherein t is 1 to 25, and groups of formula -alkylenyl-$(OCH_2)_tOH$ wherein t is 1 to 25. Those skilled in the art will appreciate that many substituents can be substituted with additional substituents.

The term "vessel," as used herein, refers to any suitable container that can receive a hydrocarbon fluid that is displaced from a subterranean formation. An example of a suitable vessel includes, but is not limited to, pipelines, tanks, ships, floating production storage and offloading units (FPSOs), floating storage and offloading units (FSOs), or any unit that can transport or store a hydrocarbon fluid.

The term "viscosity," as used herein, expressed as the ratio of shear stress (force per unit area) to the shear rate (rate change of shear strain), refers to a fluid's resistance to flow. Viscosity can further be described as the internal friction of a moving fluid. A fluid with a high viscosity can resist motion because its molecular makeup provides significant internal friction. A fluid with low viscosity can flow easily because its molecular makeup results in very little friction when it is in motion.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present invention. All publications, patent applications, patents and other references mentioned herein are incorporated by reference in their entirety. The materials, methods, and examples disclosed herein are illustrative only and not intended to be limiting.

The terms "comprise(s)," "include(s)," "having," "has," "can," "contain(s)," and variants thereof, as used herein, are intended to be open-ended transitional phrases, terms, or words that do not preclude the possibility of additional acts or structures. The singular forms "a," "and" and "the" include plural references unless the context clearly dictates otherwise. The present disclosure also contemplates other embodiments "comprising," "consisting of" and "consisting essentially of," the embodiments or elements presented herein, whether explicitly set forth or not.

The compounds, compositions, methods, and processes of the invention will be better understood by reference to the following examples, which are intended as an illustration of and not a limitation upon the scope of the invention.

EXAMPLES

The foregoing can be better understood by reference to the following examples, which are presented for purposes of illustration and are not intended to limit the scope of the invention. All reagents were purchased from commercial sources and used as received unless stated otherwise. N,N'-(1,2-dihydroxyethylene)bisacrylamide, also known as glyoxal bis(acrylamide) is abbreviated herein as GBA.

Example 1

General Procedure for Preparation of Poly(Acrylic Acid-Acrylamide)

A poly(acrylic acid-acrylamide) product was produced by polymerizing a water-in-oil emulsion including an aqueous monomer phase and an external hydrocarbon oil phase. The monomer phase included an aqueous mixture of about 29 mole % of acrylic acid and 71 mole % of acrylamide, neutralized in an ice bath with a sodium hydroxide solution to pH 7-8.5. In addition, a cross-linker of glyoxal bisacrylamide containing solution, a chain transfer agent of sodium formate, and a chelant of tetrasodium diethylenediaminetetraacetate were added to the monomer phase. The glyoxal bisacrylamide-containing solution was prepared by adding glyoxal into an acrylamide aqueous solution neutralized with a sodium hydroxide solution to pH 8 to 8.5 and stirring the mixture at 37° C. for 2 to 3 hours. The oil phase included a hydrocarbon oil and one or more surfactants.

The emulsion was formed by adding the monomer phase to the oil phase under agitation at 38 to 44° C. and mixing for a minimum of 30 minutes.

The polymerization was initiated by addition of 2,2'-azobisisobutryonitrile and purging of nitrogen at the reaction temperature of 38 to 44° C. After the polymerization reaction reached 85% conversion, the emulsion was post-heated at 57° C. or above for at least one hour to complete the polymerization and reduce monomer residuals.

Dissolution of the polymer emulsion in synthetic sea salt water was affected by mixing the emulsion into the sea salt water under shear, in the presence of a high hydrophilic/lipophilic balance (HLB) nonionic surfactant at a concentration of less than 10% of the weight of the emulsion polymer. Part of the fresh made-down polymer solution was used right away for filter ratio determination and bulk viscosity measurement. Another part of it was activated in an oven at 70° C. for 5-22 hours for the filter ratio determination and bulk viscosity measurement.

Example 2

Product I

Product I was produced by following the general procedure of Example 1. The monomer phase consisted of 370.676 g of 50.30 wt. % acrylamide, 137.082 g of deionized water and 78.730 g of acrylic acid, neutralized in an ice-bath with 84.000 g of 50 wt. % aqueous sodium hydroxide solution. In addition, a glyoxal bisacrylamide-containing solution comprising of 0.120 g of 1 wt. % glyoxal solution, 9.940 g of 50.3 wt. % acrylamide and 0.80 g of 1 wt. % sodium hydroxide solution, 0.350 g of sodium formate and 0.090 g of tetrasodium diethylenediaminetetraacetate were added to the monomer phase. The oil phase consisted of 280.000 g of a parrafinic solvent (Exxsol D80), 13.060 g of sorbitan monooleate (Span® 80) and 21.940 g of polyoxyethylene sorbitan trioleate (Tween® 85). For the polymerization, 0.528 g of 2,2'-azobisisobutryonitrile was used.

Example 3

Product II

Product II was produced by following the general procedure of Example 1. The monomer phase consisted of 370.676 g of 50.30 wt. % acrylamide, 137.257 g of deionized water and 78.730 g of acrylic acid, neutralized in an ice bath with 84.000 g of 50 wt. % aqueous sodium hydroxide solution. In addition, a glyoxal bisacrylamide containing solution comprising of 0.120 g of 1 wt. % glyoxal solution, 9.940 g of 50.3 wt. % acylamide and 0.80 g of 1 wt. % sodium hydroxide solution, 0.175 g of sodium formate and 0.090 g of tetrasodium diethylenediaminetetraacetate were added to the monomer phase. The oil phase consisted of 280.000 g of parrafinic solvent (Exxsol D80), 13.060 g of sorbitan monooleate (Span® 80) and 21.940 g of polyoxyethylene sorbitan trioleate (Tween® 85). For the polymerization, 0.528 g of 2,2'-azobisisobutryonitrile was used.

Example 4

Product III

Product III was produced by following the general procedure of Example 1. The monomer phase consisted of 370.040 g of 50.40 wt. % acrylamide, 139.853 g of deionized water and 78.730 g of acrylic acid, neutralized in an ice bath with 84.000 g of 50 wt. % aqueous sodium hydroxide solution. In addition, a glyoxal bisacrylamide containing solution comprising of 0.120 g of 1 wt. % glyoxal solution, 9.821 g of 50.4 wt. % acrylamide and 0.80 g of 1 wt. % sodium hydroxide solution, 0.350 g of sodium formate and 0.090 g of tetrasodium diethylenediaminetetraacetate were added to the monomer phase. The oil phase consisted of 280.000 g of parrafinic solvent (Exxsol D80), 11.754 g of sorbitan monooleate (Span® 80), 23.246 g of polyoxyethylene sorbitan trioleate (Tween® 85) and 0.200 g of Hypermer™ B210. For the polymerization, 0.396 g of 2,2'-azobisisobutryonitrile was used.

Example 5

Product IV

Product IV was produced by following the general procedure of Example 1. The monomer phase consisted of 370.676 g of 50.30 wt. % acrylamide, 137.082 g of deionized water and 78.730 g of acrylic acid, neutralized in an ice bath with 84.000 g of 50 wt. % aqueous sodium hydroxide solution. In addition, a glyoxal bisacrylamide-containing solution comprising of 0.120 g of 1 wt. % glyoxal solution, 9.940 g of 50.3% acrylamide and 0.80 g of 1 wt. % sodium hydroxide solution, and 0.090 g of tetrasodium diethylenediaminetetraacetate were added to the monomer phase. The oil phase consisted of 280.000 g of parrafinic solvent (Exxsol D80), 13.060 g of sorbitan monooleate (Span® 80) and 21.940 g of polyoxyethylene sorbitan trioleate (Tween® 85). For the polymerization, 0.528 g of 2,2'-azobisisobutryonitrile was used.

Example 6

Product V

Product V was produced by following the general procedure of Example 1. The monomer phase consisted of 370.040 g of 50.40 wt. % acrylamide, 140.053 g of deionized water and 78.730 g of acrylic acid, neutralized in an ice bath with 84.000 g of 50 wt. % aqueous sodium hydroxide solution. In addition, a glyoxal bisacrylamide containing solution comprising of 0.120g of 1 wt. % glyoxal solution, 9.821 g of 50.4 wt. % acrylamide and 0.80 g of 1 wt. % sodium hydroxide solution, 0.350 g of sodium formate and 0.090 g of tetrasodium diethylenediaminetetraacetate were added to the monomer phase. The oil phase consisted of 280.000 g of parrafinic solvent (Exxsol D80), 10.085 g of sorbitan monooleate (Span® 80) and 24.915 g of polyoxyethylene sorbitol hexaoleate. For the polymerization, 0.396 g of 2,2'-azobisisobutryonitrile was used.

Example 7

Product VI

Product VI was produced by following the general procedure of Example 1. The monomer phase consisted of 378.963 g of 49.20 wt. % acrylamide, 15.516 g of deionized water and 78.730 g of acrylic acid, neutralized in an ice bath with 82.700 g of 50 wt. % aqueous sodium hydroxide solution. In addition, a glyoxal bisacrylamide containing solution comprising of 0.120g of 1 wt. % glyoxal solution, 10.163 g of 49.20 wt. % acrylamide and 0.310 g of 1 wt. % sodium hydroxide solution and 0.090 g of tetrasodium diethylenediaminetetraacetate were added to themonomer phase. The oil phase consisted of 331.800 g of parrafinic solvent (Exxsol D80), 11.200g of sorbitan sesquioleate (Arlacel® 83 or Span® 83) and 88.800 g of polyoxyethylene sorbitol hexaoleate. For the polymerization, 0.528 g of 2,2'-azobisisobutryonitrile was used.

Example 8

Product VII

Product VII was produced by following the general procedure of Example 1. The monomer phase consisted of 900.184 g of 47.90 wt. % acrylamide, 325.501 g of deionized water and 183.449 g of acrylic acid, neutralized in an ice bath with 190.240 g of 50 wt. % aqueous sodium hydroxide solution. In addition, a glyoxal bisacrylamide containing solution comprising of 5.592 g of 1 wt. % glyoxal solution, 49.603 g of 47.90 wt. % acrylamide and 1.841 g of 1 wt. % sodium hydroxide solution, 0.816 g of sodium formate and 0.209 g of tetrasodium diethylenediaminetetraacetate were added to the monomer phase. The oil phase consisted of 652.428 g of parrafinic solvent (Exxsol D80), 27.388 g of sorbitan monooleate (Span® 80), 54.123 g of polyoxyethylenesorbitan trioleate and 0.466 g of Hypermer™ B210. For the polymerization, 0.691 g of 2,2'-azobisisobutryonitrile was used.

Figure 2:
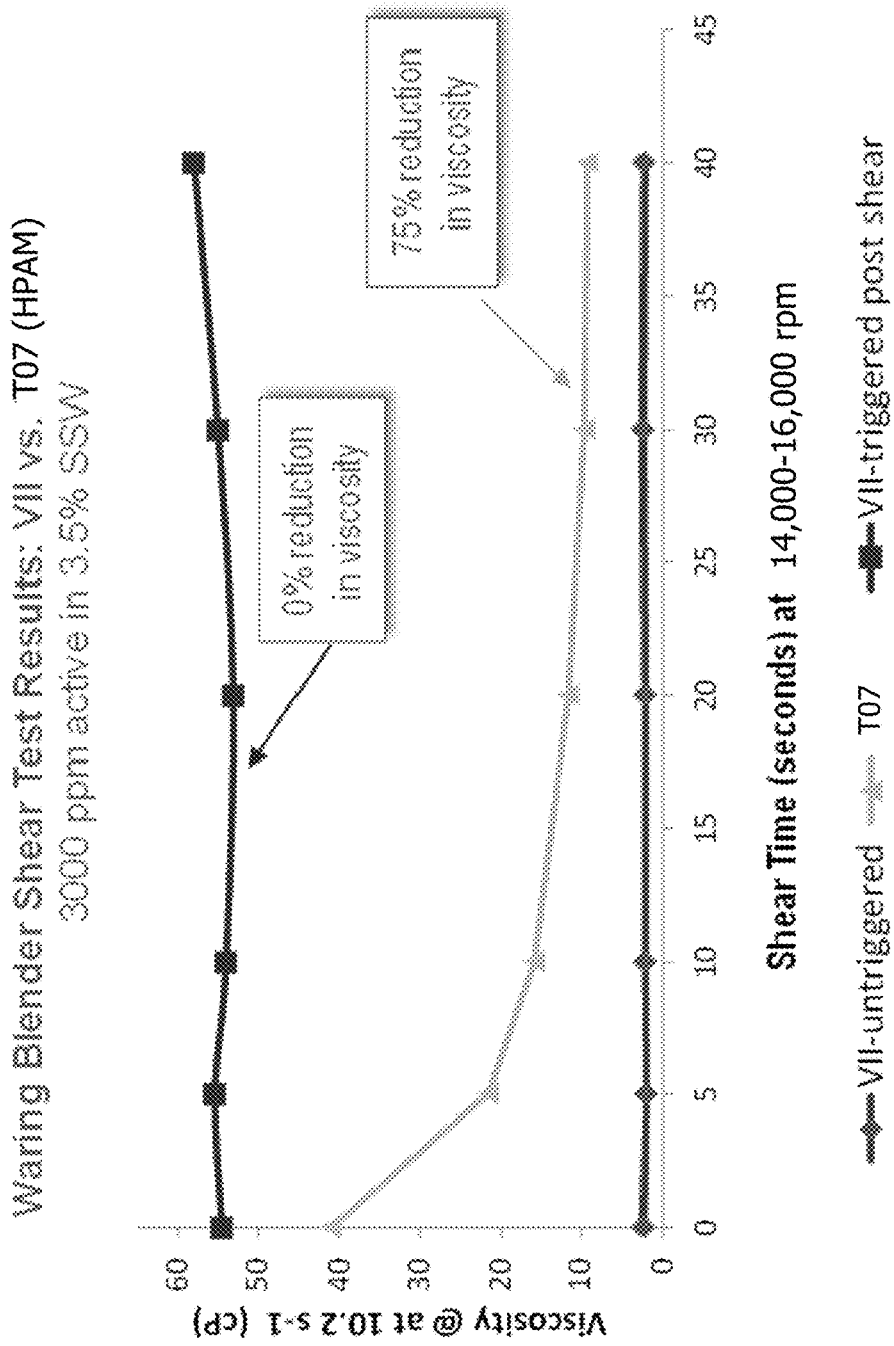
FIG. 2 is a graph of the viscosity at 10.2 $s^{-1}$ (cP) versus shear time in seconds at 14000-16000 rpm.

Utilizing a modified version of the shear degradation procedure reported in the API RP63, a 2000 ppm polymer solution was prepared in synthetic sea water and forced through a 0.01" I.D. capillary tube at different flow/shear rates and the viscosity of effluent/sheared samples were measured immediately at 25° C. and 10.2 s$^{-1}$. The effluent samples of Product VII were subsequently triggered and the viscosities were measured again. The viscosity versus the shear rate is shown in FIG. 1. Another shear test was done using Waring blender and the viscosity versus the shear time is shown in FIG. 2. For FIGS. 1 and 2, "SSW" corresponds to synthetic salt water. It is known in the industry that traditional hydrolyzed polyacrylamides (HPAMs) lose 20 to 50% of their initial viscosity upon exposure to significant shear. This was confirmed in the experiment described above; however, Product VII showed no loss in its initial viscosity when exposed to shear in the untriggered form and also no loss in viscosity when it was subsequently thermally triggered.

Example 9

Product VIII

Product VIII was produced by following the general procedure of Example 1. The monomer phase consisted of 280.123 g of 50.00 wt. % acrylamide, 154.059 g of deionized water and 76.437 g of acrylic acid, neutralized in an ice bath with 82.452 g of 50 wt. % aqueous sodium hydroxide solution. In addition, a glyoxal bisacrylamide containing solution comprising 0.500 g of 40 wt. % glyoxal solution, 99.000 g of 50.00 wt. % acrylamide and 0.2578 g of 10 wt. % sodium hydroxide solution, 0.340 of sodium formate and 0.087 g of tetrasodium diethylenediaminetetraacetate was added to the monomer phase. The oil phase consisted of 271.845 g of parrafinic solvent (Exxsol D80), 11.412 g of sorbitan monooleate (Span® 80) and 22.569 g of polyoxyethylenesorbitan trioleate. For the polymerization, 0.288 g of 2,2'-azobisisobutryonitrile was used. Before post-heat, 1.610 g of 2.8% tert-butyl hydroperoxide aqueous solution and 1.330 g of 10% sodium metabisulfite aqueous solution were added over 30 minutes.

Example 10

Filter Ratios and Flow Rates of Various Products I-VIII

The apparatus used to measure the filter ratio of flooding fluids was a steel bell filter ratio housing (from OFI) which was connected to a pressurized nitrogen line to ensure a constant nitrogen pressure of 20 psi for the filter ratio and flow rate measurements. A 1.2 to 5.0 pore size micron membrane filter was used for the filtration, and a computer was connected to a digital balance to record the weight of the polymer solution passed through the filter and the time to pass through the filter. Around 250 grams of a 3000 ppm or 1000 ppm polymer active solution made down in synthetic sea water were used, the filter ratio was calculated by the time used for filtering 180.0 grams to 210.0 grams of the polymer solution divided the time used for filtering 90.0 grams to 120.0 grams of the polymer solution and the flow rate was calculated by the weight of 210.0 grams divided by the total time used for the filtration of the 210.0 grams of the polymer solution.

The filter ratios and flow rates for both fresh and activated polymer solutions were determined using the method above. The method used conforms closely to the American Petroleum Institute standard (API 63). Bulk viscosities for both solutions were measured in programmable viscometer at 25° C. and a shear rate of 10.2/s.

Data for Products I-VIII described in Examples 2-9 are presented below.

| Product | Droplet Size (μm) |
|---|---|
| I | 0.642 |
| II | 0.732 |
| III | 0.590 |
| IV | 0.755 |
| V | 0.551 |
| VI | 75.3 |
| VII | 0.581 |
| VIII | 0.612 |

| Product | Conc (ppm) | Activation time at 70° C. | Bulk Viscosity (cP) at 25° C. after activation | Filter ratio | Membrane filter (μm) | Flow rate (grams/s) |
|---|---|---|---|---|---|---|
| I | 3000 | 0* | 1.77 | 1.05 | 5.0 | 1.38 |
|  |  | 0* | 1.77 | 1.13 | 1.2 | 0.96 |
|  |  | 5 | 67.24 | 1.02 | 5.0 | 0.10 |
|  |  | 22 | 54.24 | 1.04 | 5.0 | 0.17 |
|  |  | 22 | 54.24 | 1.07 | 1.2 | 0.16 |
| II | 3000 | 0* | 1.41 | 1.00 | 5.0 | 1.60 |
|  |  | 22 | 83.23 | 1.01 | 5.0 | 0.15 |
|  |  | 22 | 83.23 | 1.09 | 1.2 | 0.11 |
| III | 3000 | 0* | 1.17 | 1.09 | 1.2 | 1.00 |
|  |  | 22 | 64.44 | 1.04 | 1.2 | 0.12 |
| IV | 3000 | 0* | 0.78 | 1.10 | 3.0 | 1.01 |
|  |  | 22 | 116.51 | 1.10 | 3.0 | 0.16 |
| V | 3000 | 0* | 0 | 1.04 | 5.0 | 1.63 |
|  |  | 22 | 57.08 | 1.02 | 5.0 | 0.26 |
|  |  | 22 | 57.08 | 1.04 | 1.2 | 0.13 |
| VI | 3000 | 0* | 1.72 | 1.06 | 3.0 | 1.68 |
|  |  | 22 | 73.04 | 1.08 | 1.2 | 0.16 |
| VII | 3000 | 0 (not activated) | 3.12 | 1.08 | 1.2 | 0.16 |
|  |  |  |  | 1.02 | 5.0 | 3.00 |
|  |  | 18 | 64.83 | 1.12 | 1.2 | 1.83 |
|  |  |  |  | 1.01 | 5.0 | 0.093 |
| VIII | 1000 | 0 (not activated) | 1.56 | 1.05 | 5.0 | 5.198 |
|  |  |  |  | 1.05 | 1.2 | 3.376 |
|  |  | 18 | 10.15 | 1.03 | 5.0 | 0.316 |
|  |  |  |  | 0.95 | 1.2 | 0.151 |

*not activated

Example 11

Shear Protection

The shear protection of the polymer was demonstrated using two types of test methods. One test method is a modified standard API RP63 method. In this test, 2000 ppm solutions of polymer VII and T07 (a standard 30/70 sodium acrylate/acrylamide emulsion polymer) were made down in synthetic sea water. Each solution was forced through a 0.01" I.D. capillary tube at different flow/shear rates, and the viscosity of each sheared effluent sample solution after passing through the orifice at each flow/shear rate was measured immediately in a programmable Brookfield viscometer at 25° C. and a shear rate of 10.2 s$^{-1}$. Each sheared effluent sample of VII was subsequently triggered by heating at 70° C. for 18 hours and the viscosity was measured at 25° C. and a shear rate of 10.2 s$^{-1}$ after cooling to room temperature. Another test was done by using a Waring blender. In the test, 3000 ppm polymer active solutions of polymer VII and T07 were made down in synthetic sea water, the polymer solutions were sheared at a constant shearing of 14,000-16,000 RPM for 0 to 40 seconds and the viscosity of each sheared polymer solution was immediately measured at 25° C. and a shear rate of 10.2 s$^{-1}$. For polymer product VII, each sheared polymer solution was subsequently triggered by heating at 70° C. for 18 hours, and the viscosity was measured at 25° C. and a shear rate of 10.2 s$^{-1}$ after cooling to room temperature.

The results shown in FIG. 1 indicate that the control polymer (T07) displayed up to about 50% degradation of the original viscosity as the shear rate was increased up to 100,000 reciprical seconds. The results for polymer solutions of VII-untriggered and VII triggered post shear show that the temporary cross-linking of the instant invention protects the polymer from shear degradation under conditions that caused significant shear degradation for polymer solutions of T07.4) When the polymer solution is sheared in the unactivated, temporarily cross-linked form (VII-untriggered, the polymer solution retains its original viscosity and can be activated after shearing to produce a polymer solution (VII triggered post shear) displaying the same original, high viscosity regardless of the shear it was subjected to in its unactivated form.

The results of the blender shear test method are shown in FIG. 2. The control polymer (T07) showed a 75% decrease in viscosity after shearing for a period of 40 seconds under the test conditions. The polymer VII performed differently. When sheared in its untriggered form, the untriggered polymer VII maintained its low viscosity. When polymer VII was triggered after shearing (post-shear), the viscosity remained high and unchanged. The results show that polymer VII is shear resistant when subjected to shear in its untriggered form.

It is understood that the foregoing detailed description and accompanying examples are merely illustrative and are not to be taken as limitations upon the scope of the invention, which is defined solely by the appended claims and their equivalents.

Various changes and modifications to the disclosed embodiments will be apparent to those skilled in the art. Such changes and modifications, including without limitation those relating to the chemical structures, substituents, derivatives, intermediates, syntheses, compositions, formulations, or methods of use of the invention, can be made without departing from the spirit and scope thereof.

What is claimed is:

1. A method for increasing recovery of crude oil from a subterranean hydrocarbon-containing formation, the method comprising:

injecting an aqueous flooding fluid into a well that is in contact with the subterranean hydrocarbon-containing formation, the aqueous flooding fluid comprising an emulsion of an aqueous phase and an oil phase, the aqueous phase comprising a cross-linked water-soluble polymer and the oil phase comprising a surfactant and an organic solvent or a hydrocarbon oil, wherein after injecting the aqueous flooding fluid into the formation, cross-links break to produce an un-crosslinked water-soluble polymer in the aqueous flooding fluid and the un-crosslinked water-soluble polymer moves throughout the formation without blocking pores of the formation, thereby providing mobility control of the crude oil without blocking pores in the formation;

wherein the water-soluble polymer comprises from about 1 mol% to about 99 mol% acrylamide repeat units and at least one anionic monomer unit derived from a monomer selected from the group consisting of an acrylic acid salt, a methacrylic acid salt, a 2-acrylamido-2-methylpropane suulfonic acid salt and a styrene sulfonic acid salt and wherein the cross-links formed by covalently bonded cross-linking units having the following formula (IIa):

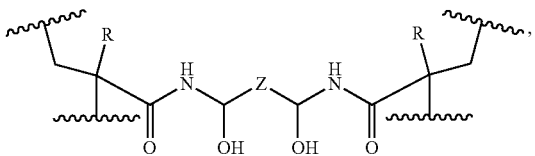

wherein:
each R is independently hydrogen or methyl;
Z is a bond or a $C_1$-$C_{12}$ alkylenyl group; and
each ∼∼∼ represents a point of attachment to a first polymer backbone, and each ∼∼∼ represents a point of attachment to the first polymer backbone or to a second polymer backbone;
wherein after cross-links break in the cross-linked water-soluble polymer, the aqueous flooding fluid comprising the un-crosslinked water-soluble polymer has a filter ratio of from 0.8 to about 1.5 and a flow rate of at least 0.1 g/s when a membrane filter size is 5 microns and the pressure is 20 psi.

2. The method claim 1, wherein the membrane filter size is 1.2 microns.

3. The method of claim 2, wherein the aqueous flooding fluid as injected into the well has a filter ratio of from 1 to about 1.2.

4. The method of claim 2, wherein the aqueous flooding fluid as injected into the well has a filter ratio of from 1 to about 1.1.

5. The method of claim 1, wherein the surfactant is a high molecular weight, structured multiester of a polyol or high molecular weight, structured multiether of polyol has a molecular weight from about 950 Daltons to about 500,000 Daltons.

6. The method of claim 5, wherein the high molecular weight, structured multiester of a polyol or high molecular weight, structured multiether of a polyol has a molecular weight from about 950 Daltons to about 50,000 Daltons.

7. The method of claim 1, wherein the surfactant is a high molecular weight, structured multiester of a polyol comprises a polyoxyalkylene sorbitan di-, tri-, or tetra-oleate, a polyoxyalkylene sorbitan di-, tri-, or tetra-stearate, a sorbitol tri-, tetra-, penta-, or hexa-oleate, a sorbitol tri-, tetra-, penta-, or hexa-stearate, a polyoxyalkylene sorbitol di-, tri-,tetra-, penta, or hexa-oleate, a polyoxyalkylene sorbitol di-, tri-, tetra-, penta-, or hexa-stearate, a copolymer of poly(12-hydroxystearic acid) and polyoxyalkylene, an alkylated polyglycerol, an oxyalkylated polyglycerol, an alkylated polyglycoside, an oxyalkylate polyglycoside, an alkylated polysaccharide, an oxyalkylated polysaccharide, or a combination thereof.

8. The method of claim 1, wherein one or more of the cross-links between polymer strands are broken by hydrolysis.

9. The method of claim 1, wherein the surfactant comprises a polyoxyethylene sorbitan trioleate, a copolymer of poly(12-hydroxystearic acid) and poly(ethylene oxide), polyoxyethylene sorbitol hexaoleate, or a combination thereof.

10. The method of claim 1, wherein the aqueous flooding fluid further comprises a surfactant of sorbitan monooleate, sorbitan dioleate, sorbitan trioleate or combination thereof.

11. The method of claim 1, wherein an average aqueous droplet size in the emulsion is from about 0.01 micron to about 100 micron.

12. The method of claim 11, wherein the average aqueous droplet size in the emulsion is less than about 1 micron.

13. The method of claim 1, wherein the covalently bonded cross-linking units have the following formula (IIb):

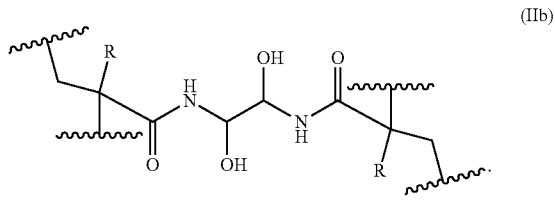

(IIb)

14. The method of claim 1, wherein the viscosity of the aqueous flooding fluid decreases less than 10% upon application of a shear rate from 30,000 $s^{-1}$ to 100,000 $s^{-1}$.

15. The method of claim 14, wherein the viscosity of the aqueous flooding fluid comprising the un-crosslinked water-soluble polymer decreases less than 5% upon application of a shear rate from 30,000 $s^{-1}$ to 100,000 $s^{-1}$ to the aqueous flooding fluid comprising the cross-linked water-soluble polymer as compared to the viscosity of an aqueous flooding fluid comprising the un-crosslinked water-soluble polymer not subjected to the shear rate from 30,000 $s^{-1}$ to 100,000 $s^{-1}$.

16. The method of claim 1, wherein the aqueous flooding fluid comprises the cross-linked water-soluble polymer and the aqueous flooding fluid is subjected to a shear rate from 30,000 $s^{-1}$ to 100,000 $s^{-1}$.

17. The method of claim 16, wherein when cross-links break to form the un-crosslinked water-soluble polymer, the viscosity of the aqueous flooding fluid decreases less than 10% upon application of a shear rate from 30,000 $s^{-1}$ to 100,000 $s^{-1}$ to the aqueous flooding fluid comprising the cross-linked water-soluble polymer as compared to the viscosity of an aqueous flooding fluid comprising the un-crosslinked water-soluble polymer not subjected to the shear rate from 30,000 $s^{-1}$ to 100,000 $s^{-1}$.

18. The method of claim 16, wherein when cross-links break to form the un-crosslinked water-soluble polymer, the viscosity of the aqueous flooding fluid decreases less than 1% upon application of a shear rate from 30,000 $s^{-1}$ to 100,000 $s^{-1}$ to the aqueous flooding fluid comprising the cross-linked water-soluble polymer as compared to the viscosity of an aqueous flooding fluid comprising the un-crosslinked water-soluble polymer not subjected to the shear rate from 30,000 $s^{-1}$ to 100,000 $s^{-1}$.

19. The method of claim 1, wherein the water-soluble polymer comprises about 0.1 ppm to about 20,000 ppm hydrolyzable cross-linking units based on the weight of the water-soluble polymer.

20. The method of claim 1, wherein the water-soluble polymer comprises from about 0.1 ppm to about 500 ppm covalently bonded cross-linking units based on the weight of the water-soluble polymer.

* * * * *

UNITED STATES PATENT AND TRADEMARK OFFICE
CERTIFICATE OF CORRECTION

PATENT NO.         : 10,442,980 B2
APPLICATION NO.    : 14/445599
DATED              : October 15, 2019
INVENTOR(S)        : Xiaojin Harry Li et al.

Page 1 of 1

It is certified that error appears in the above-identified patent and that said Letters Patent is hereby corrected as shown below:

On the Title Page

On Column 2, item (56) under "Other Publications":
"Progresss" should read "Progress"

In the Claims

On Column 35, Claim 1, Line 64:
"suulfonic" should read "sulfonic"

On Column 36, Claim 2, Line 24:
"method claim 1" should read "method of claim 1"

Signed and Sealed this
Twenty-second Day of December, 2020

Andrei Iancu
*Director of the United States Patent and Trademark Office*